(12) United States Patent
Lim et al.

(10) Patent No.: US 8,294,855 B2
(45) Date of Patent: Oct. 23, 2012

(54) METHOD OF FABRICATING A LIQUID CRYSTAL DISPLAY DEVICE

(75) Inventors: Joo Soo Lim, Gumi-si (KR); Woong Sik Kim, Seongnam-si (KR)

(73) Assignee: LG Display Co., Ltd., Seoul (KR)

( * ) Notice: Subject to any disclaimer, the term of this patent is extended or adjusted under 35 U.S.C. 154(b) by 42 days.

(21) Appl. No.: 12/458,456

(22) Filed: Jul. 13, 2009

(65) Prior Publication Data

US 2009/0275155 A1 Nov. 5, 2009

Related U.S. Application Data

(62) Division of application No. 11/168,315, filed on Jun. 29, 2005, now Pat. No. 7,626,669.

(30) Foreign Application Priority Data

Dec. 4, 2004 (KR) .......................... 10-2004-0101554

(51) Int. Cl.
  *G02F 1/1335* (2006.01)
  *G02F 1/1345* (2006.01)
  *G02F 1/13* (2006.01)

(52) U.S. Cl. .......................... 349/114; 349/152; 349/187

(58) Field of Classification Search .................. 349/114, 349/149, 153, 152, 187
See application file for complete search history.

(56) References Cited

U.S. PATENT DOCUMENTS

| 5,162,933 A | 11/1992 | Kakuda et al. |
| 5,317,433 A | 5/1994 | Miyawaki et al. |
| 5,339,181 A | 8/1994 | Kim et al. |
| 5,462,887 A | 10/1995 | Glück |
| 5,668,379 A | 9/1997 | Ono et al. |
| 5,731,856 A | 3/1998 | Kim et al. |
| 5,771,083 A | 6/1998 | Fujihara et al. |
| 5,793,460 A | 8/1998 | Yang |
| 5,847,781 A | 12/1998 | Ono et al. |
| 6,100,954 A | 8/2000 | Kim et al. |
| 2002/0033918 A1 | 3/2002 | Shigeno et al. ............... 349/114 |
| 2003/0086046 A1* | 5/2003 | You ............................... 349/149 |
| 2003/0160921 A1* | 8/2003 | Nakashima et al. .......... 349/113 |
| 2003/0197181 A1* | 10/2003 | Yun .................................. 257/72 |

(Continued)

FOREIGN PATENT DOCUMENTS

CN 1385743 A 12/2002

(Continued)

*Primary Examiner* — Jessica M Merlin
(74) *Attorney, Agent, or Firm* — McKenna Long & Aldridge, LLP

(57) ABSTRACT

The present invention relates to a transflective thin film transistor substrate and method of fabricating the same that is adaptive for simplifying its process. The liquid crystal display device includes: first and second substrates; a gate line on the first substrate; a gate insulating film on the first substrate; a data line crossing the gate line to define a pixel area; a thin film transistor connected to the gate line and the data line; an organic insulating film on the gate line, the data line and the thin film transistor, and having a transmission hole in the pixel area; a pixel electrode on the organic insulating film of the pixel area via the transmission hole and connected to the thin film transistor; and a reflective electrode on the pixel electrode having a same edge part as the pixel electrode or an edge part located at inner side from an edge part of the pixel electrode and exposing the pixel electrode of the transmission hole.

14 Claims, 31 Drawing Sheets

U.S. PATENT DOCUMENTS

| | | |
|---|---|---|
| 2004/0051823 A1* | 3/2004 | Choi .................................. 349/43 |
| 2004/0085488 A1 | 5/2004 | Cho et al. .......................... 349/40 |
| 2004/0201803 A1 | 10/2004 | Yang |
| 2004/0207795 A1* | 10/2004 | Sakai et al. .................... 349/149 |

FOREIGN PATENT DOCUMENTS

| | | |
|---|---|---|
| CN | 1395140 A | 2/2003 |
| CN | 1397829 | 2/2003 |
| CN | 1538227 A | 10/2004 |
| JP | 2003-131246 A | 5/2003 |
| JP | 2003-248232 | 9/2003 |
| JP | 2004-294807 | 10/2004 |
| JP | 2004-318073 | 11/2004 |
| TW | 567369 A | 6/1991 |

* cited by examiner

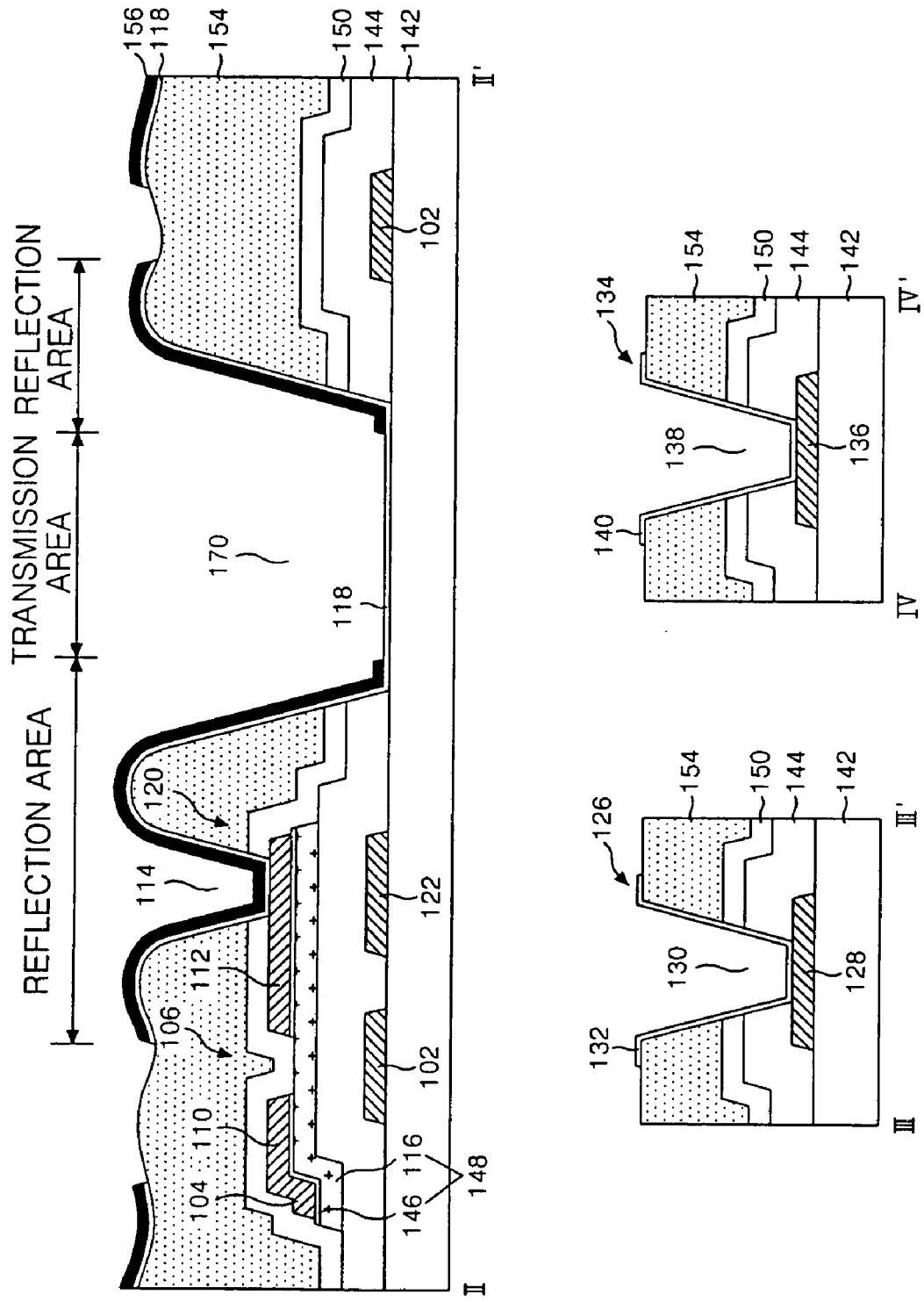

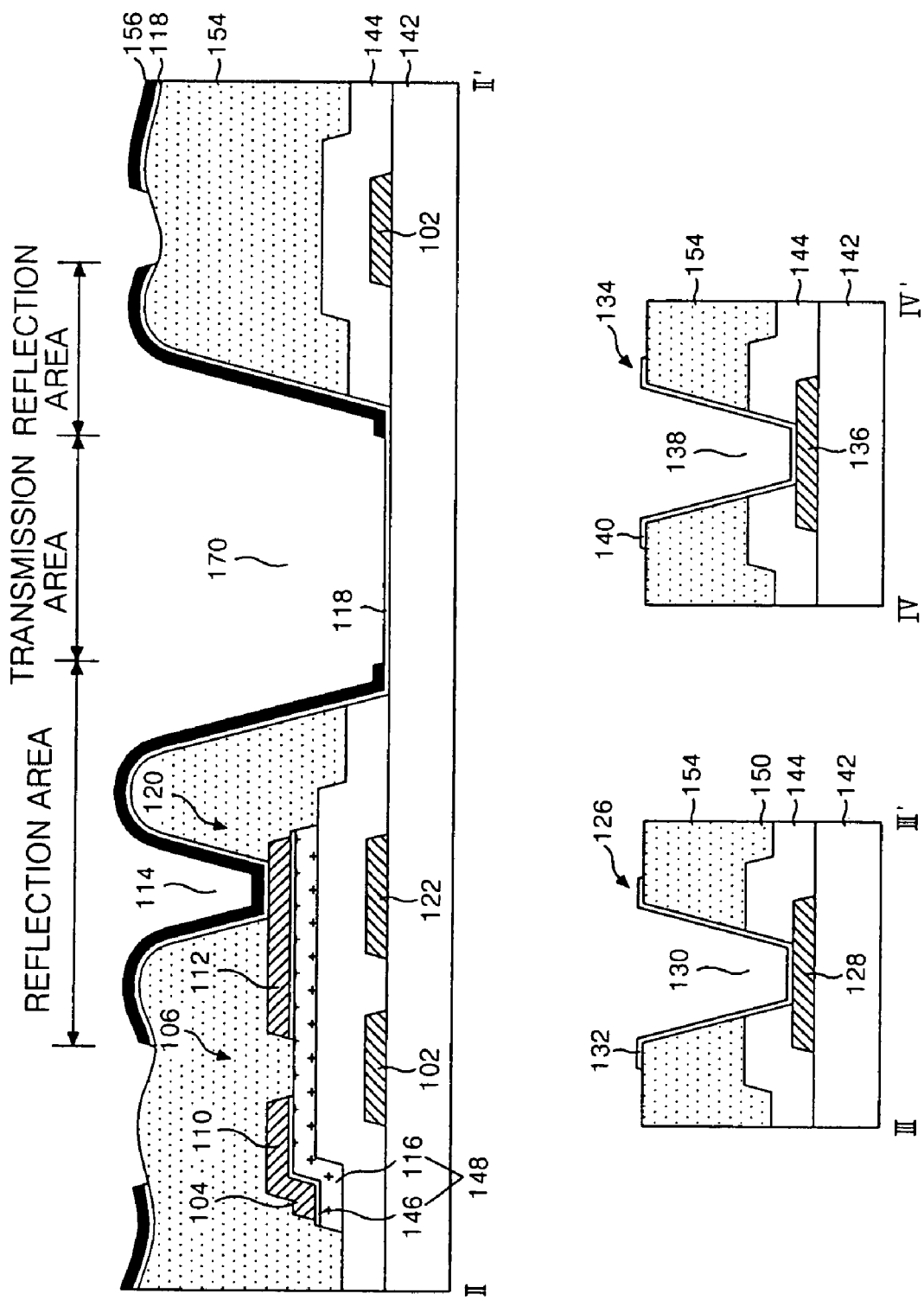

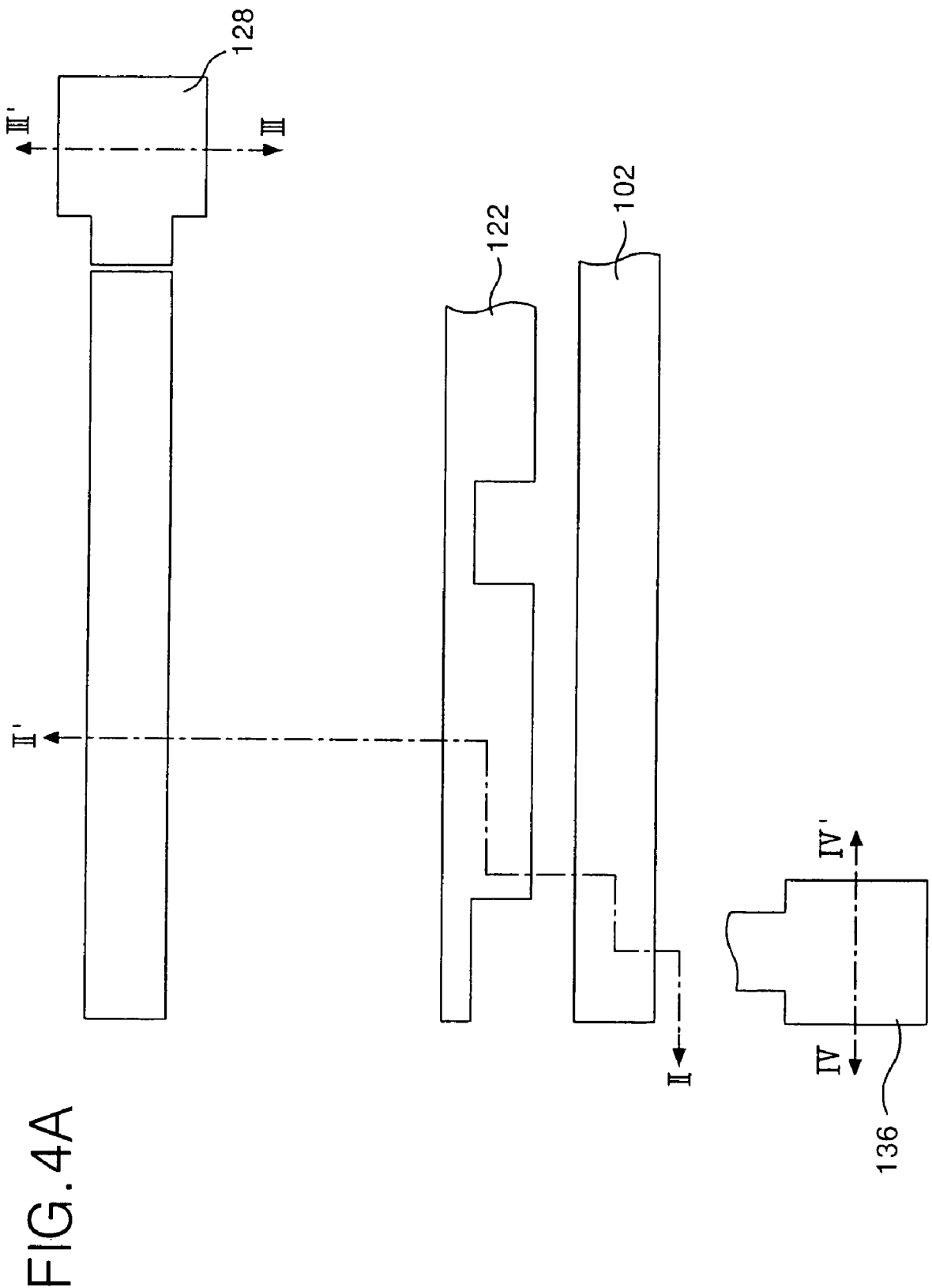

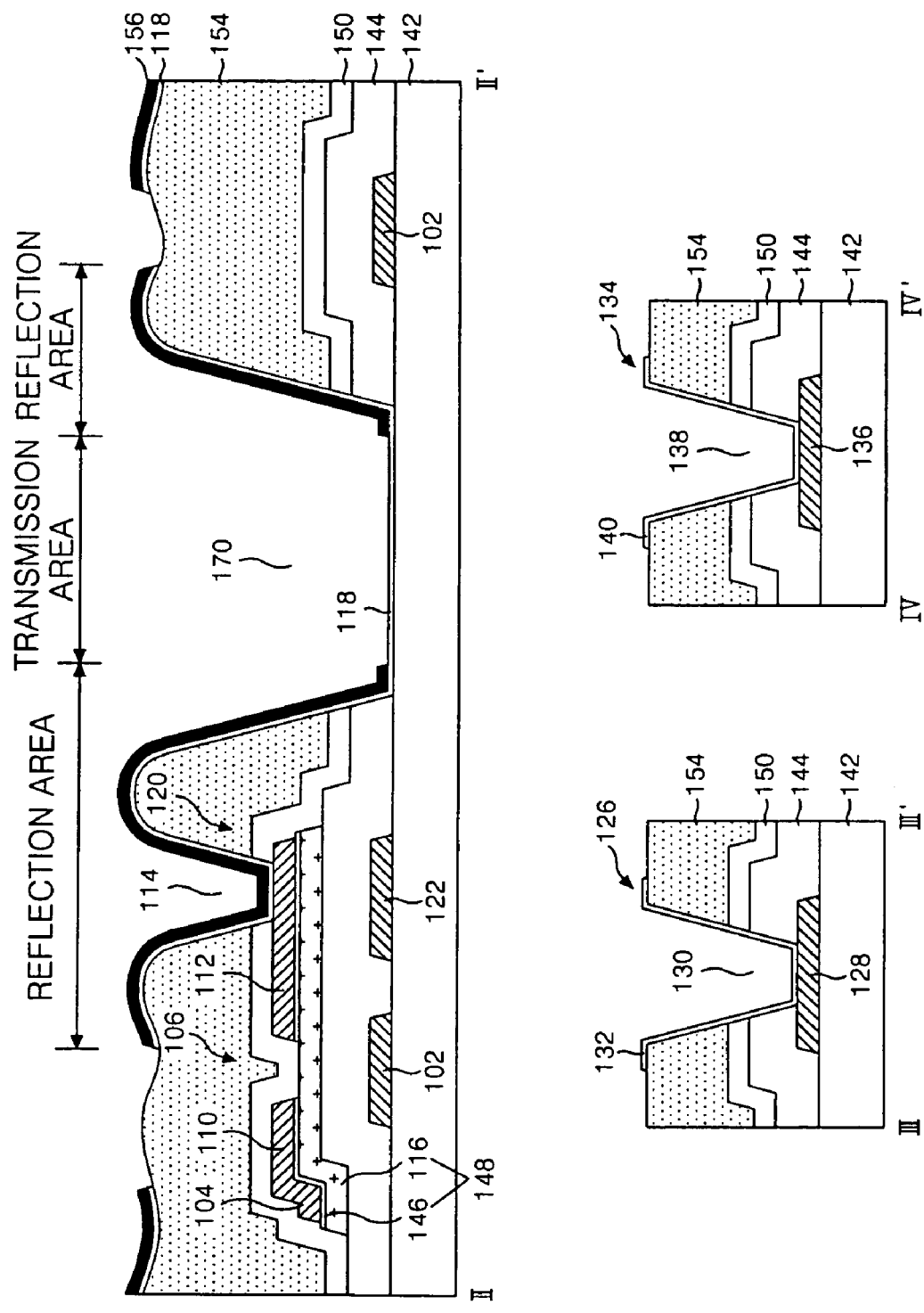

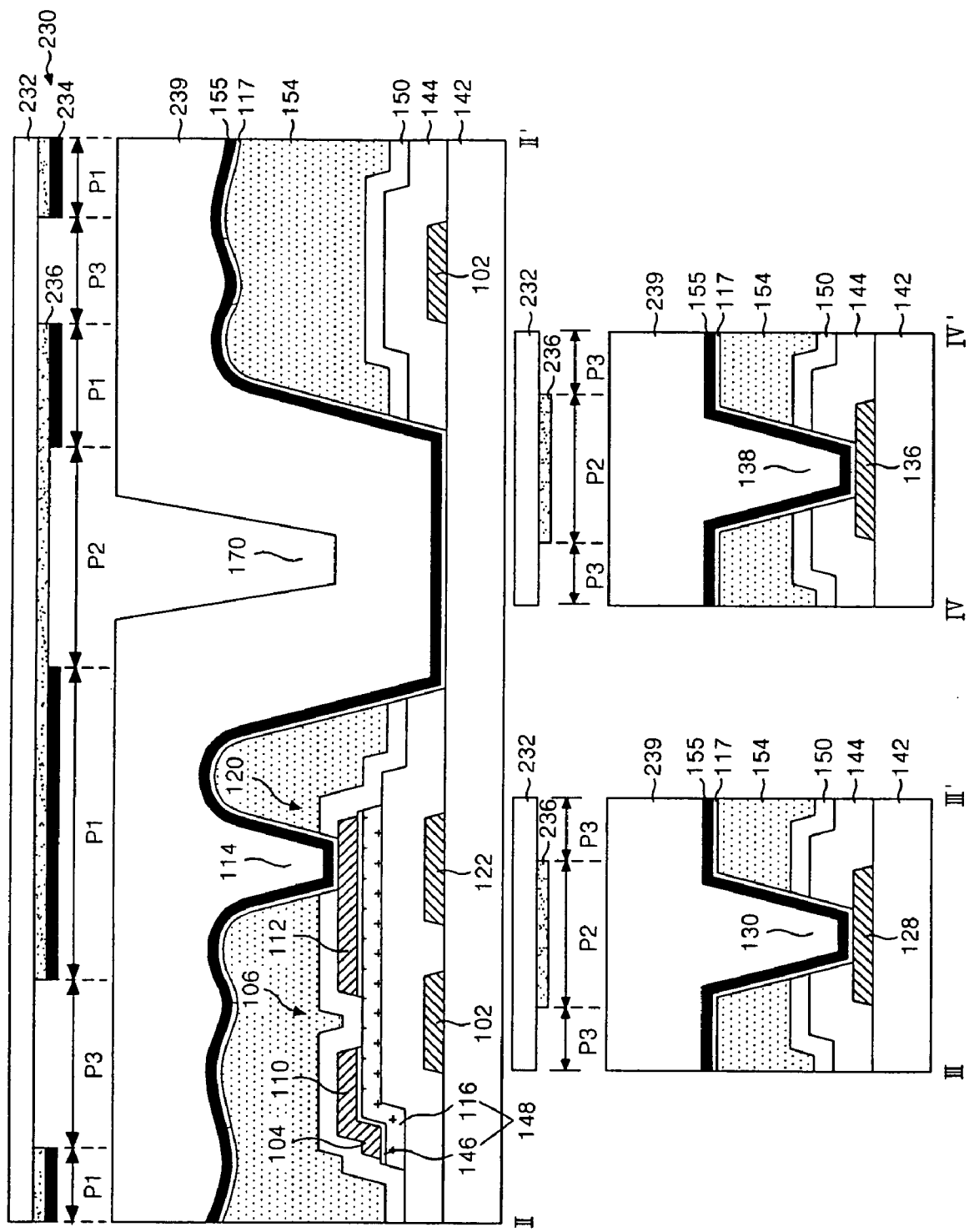

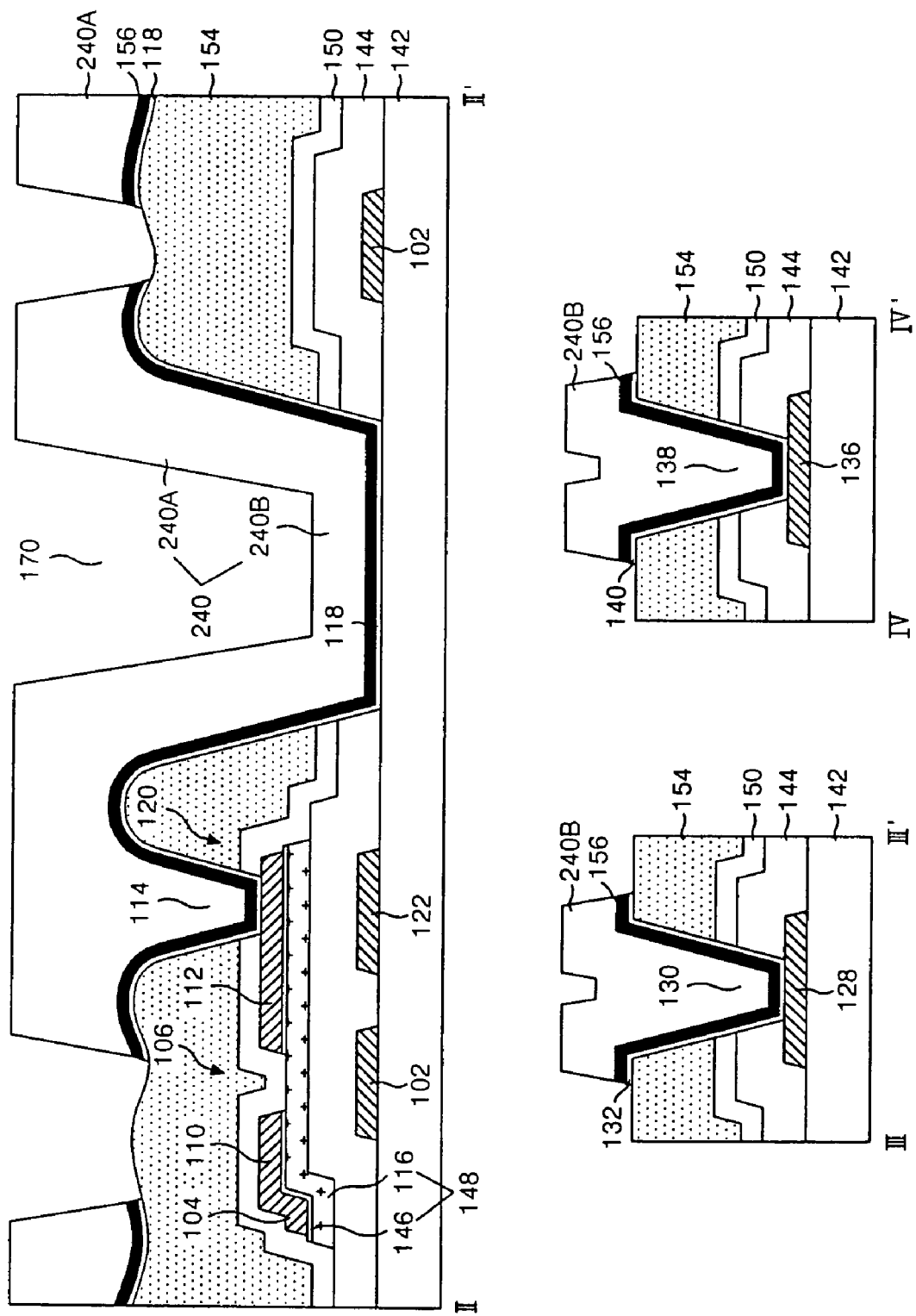

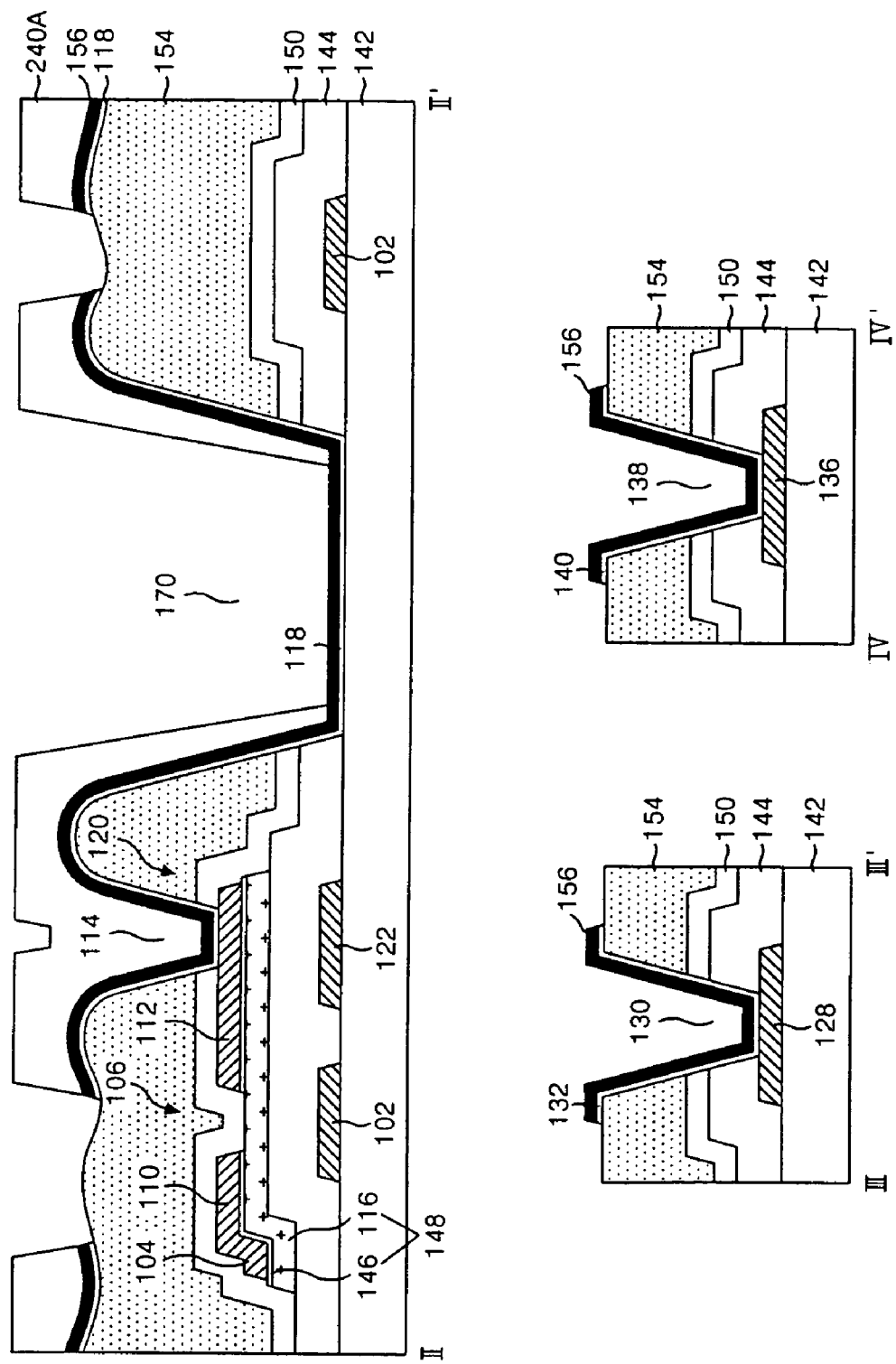

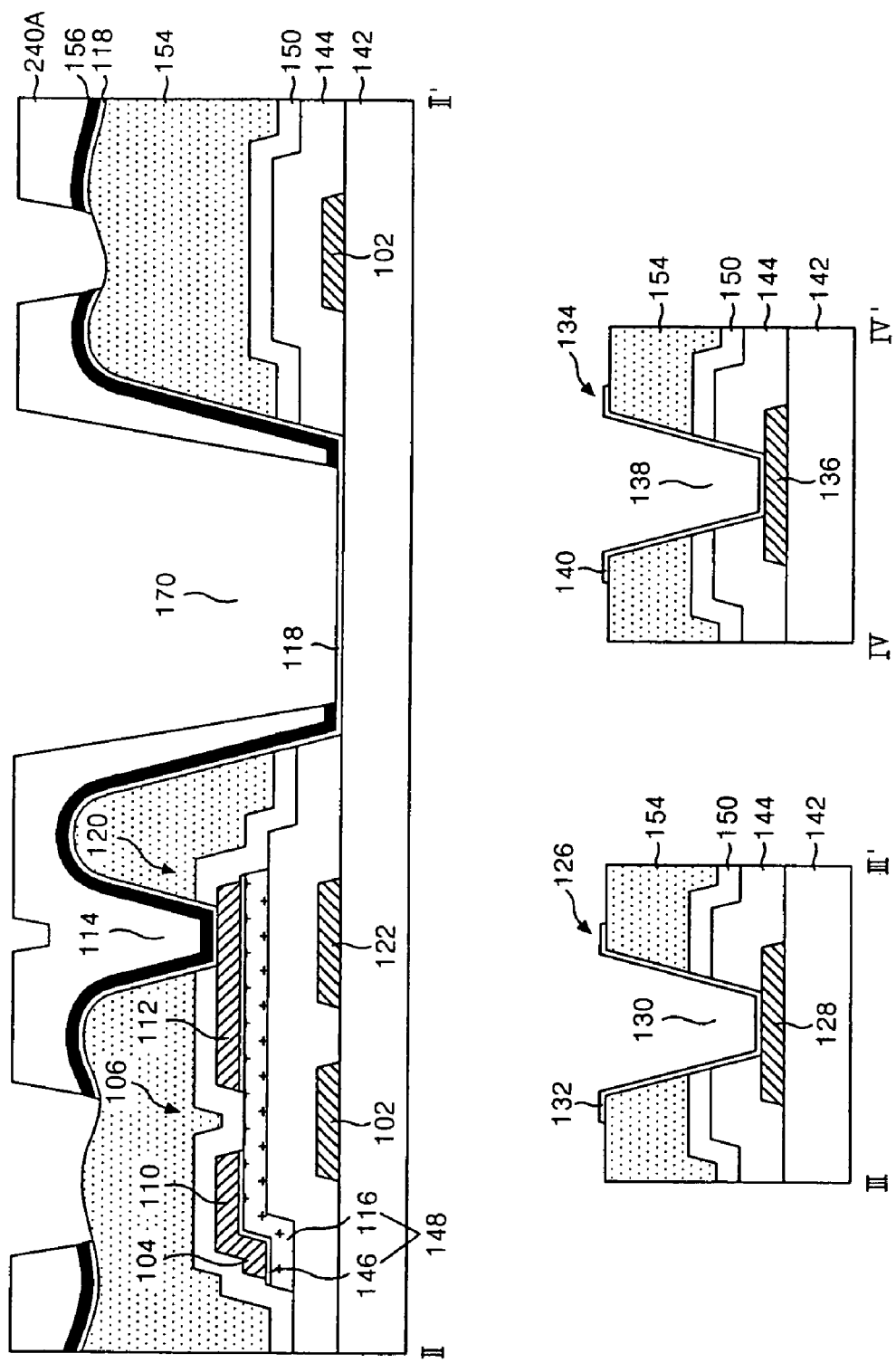

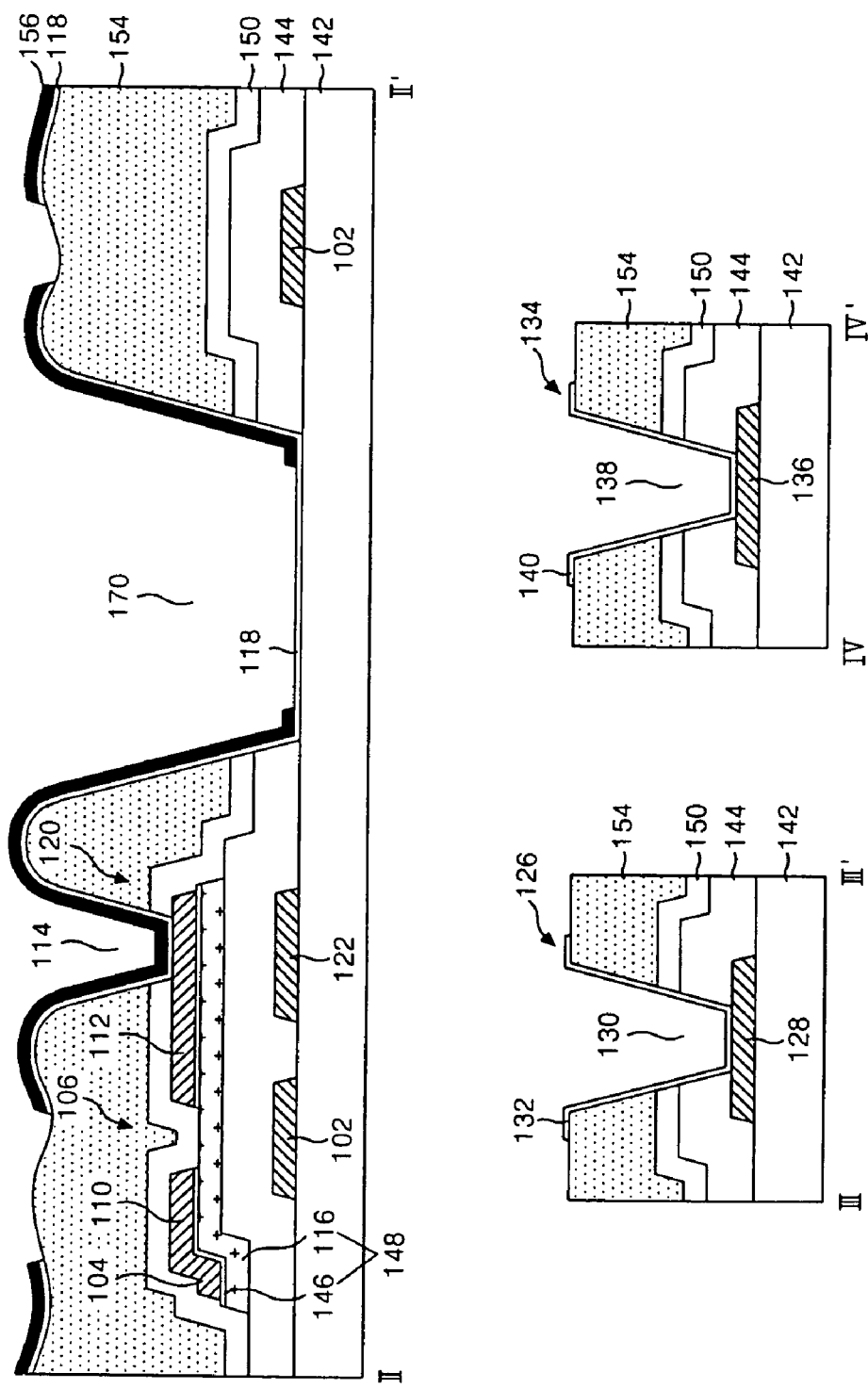

METHOD OF FABRICATING A LIQUID CRYSTAL DISPLAY DEVICE

CROSS-REFERENCE TO RELATED APPLICATIONS

This application is a Divisional of application Ser. No. 11/168,315 filed Jun. 29, 2005 now U.S. Pat. No. 7,626,669, now allowed, which claims priority to Korean Patent Application No. 10-2004-101554, filed Dec. 4, 2004 all of which are hereby incorporated by reference for all purposes as if fully set forth herein.

BACKGROUND OF THE INVENTION

1. Field of the Invention

The present invention relates to a transflective thin film transistor substrate of a liquid crystal display device. More particularly, the present invention relates to a transflective thin film transistor substrate and method of fabricating the same that is adaptive for simplifying a manufacturing process.

2. Description of the Related Art

A liquid crystal display device controls the light transmissivity of liquid crystal, which has dielectric anisotropy, by use of an electric field, thereby displaying a picture. The liquid crystal display device includes a liquid crystal display panel to display a picture through a liquid crystal cell matrix, and a drive circuit to drive the liquid crystal display panel.

In FIG. 1, a related art liquid crystal display panel includes a color filter substrate 10 and a thin film transistor substrate 20 which are bonded to each other and have a liquid crystal material 24 therebetween.

The color filter substrate 10 includes a black matrix 4, a color filter 6 and a common electrode 8 which are sequentially formed on an upper glass substrate 2. The black matrix 4 is formed on the upper glass substrate 2 in a matrix shape. The black matrix 4 divides the area of the upper glass substrate 2 into a plurality of cell areas in which a color filter 6 is to be formed, and prevents an optical interference and external light reflection between the adjacent cells. The color filter 6 is formed and divided into red R, green G, blue B in the cell area divided by the black matrix 4 to transmit red, green and blue lights respectively. The common electrode 8 supplies a common voltage Vcom to a transparent conductive layer, which is spread over the entire surface of the color filter 6, wherein the common voltage Vcom becomes a reference when driving the liquid crystal material 24. And, to flatten the color filter 6, an overcoat layer (not shown) is additionally formed between the color filter 6 and the common electrode 8.

The thin film transistor substrate 20 includes a thin film transistor 18 and a pixel electrode 22, wherein the thin film transistor 18 is formed in each cell area defined by a crossing of a gate line 14 and a data line 16 in a lower glass substrate 12. The thin film transistor 18 supplies a data signal from the data line 16 to the pixel electrode 22 in response to a gate signal from the gate line 14. The pixel electrode 22 formed of a transparent conductive layer supplies the data signal from the thin film transistor 18 to drive the liquid crystal material 24.

The liquid crystal material 24 having dielectric anisotropy rotates along the electric field formed by the common voltage Vcom of the common electrode 8 and the data signal of the pixel electrode 22 to control the light transmissivity, thereby making the gray level realized.

And, the liquid crystal display panel further includes a spacer (not shown) to fixedly maintain the cell gap between the color filter substrate 10 and the thin film transistor substrate 20.

The color filter substrate 10 and the thin film transistor substrate 20 of the liquid crystal display panel are formed using a plurality of mask processes. One mask process includes a plurality of processes such as a thin film deposition (coating) process, a cleaning process, a photolithography process (hereinafter, referred to as a photo process), an etching process, a photo-resist peeling process, an inspection process and so on. Especially, the thin film transistor substrate includes a semiconductor process and requires a plurality of mask processes. Thus, the manufacturing process is complicated so that it becomes a material cause for the increase of the liquid crystal display panel manufacturing cost.

The liquid crystal display device is generally classified into a transmissive type that a picture is displayed by use of the light being incident from a backlight unit, a reflective type that a picture is displayed by reflecting an external light such as a natural light, and a transflective type using an advantage of both the transmissive type and the reflective type.

There is a problem that the power consumption of a backlight unit is high in the transmissive type and the reflective type depends on the external light so as not to be able to display the picture in a dark environment. On the other hand, the transflective liquid crystal display device operates in the reflective mode if the external light is sufficient and in the transmissive mode if the external light is not sufficient Thus, it might be able to reduce the power consumption more than the transmissive liquid crystal display device and it is not restricted by the external light, which is different from the reflective liquid crystal display device.

To this end, the transflective liquid crystal display panel includes each pixel having a reflection area and a transmission area. Accordingly, a reflection electrode, formed in the reflection area, and an insulating film for making light paths in both the reflection area and the transmission area are the same should be further added in a transflective thin film transistor, as compared to the thin film transistor array shown in FIG. 1. As a result, since the number of mask processes would be increased, there is a problem that the manufacturing process of the related art transflective thin film transistor substrate is complex.

SUMMARY OF THE INVENTION

Accordingly, the present invention provides a transflective thin film transistor substrate and method of fabricating the same.

In order to achieve these and other features of the invention, a liquid crystal display device according to present invention includes: first and second substrates; a gate line on the first substrate; a gate insulating film on the first substrate; a data line crossing the gate line to define a pixel area; a thin film transistor connected to the gate line and the data line; an organic insulating film on the gate line, the data line and the thin film transistor, and having a transmission hole in the pixel area; a pixel electrode on the organic insulating film of the pixel area via the transmission hole and connected to the thin film transistor; and a reflective electrode on the pixel electrode having a same edge part as the pixel electrode or an edge part located at inner side from an edge part of the pixel electrode and exposing the pixel electrode of the transmission hole.

In another aspect of the invention, a method of fabricating a liquid crystal display device according to the present invention includes: providing first and second substrates; forming a gate line on the first substrate using a first mask; forming a gate insulating film on the first substrate, a semiconductor pattern on the gate insulating film, a data line crossing the gate line to define a pixel area on the semiconductor pattern, a source electrode, and a drain electrode using a second mask; forming an organic insulating film on the data line, the source electrode and the drain electrode and forming a transmission hole passing through the organic insulating film using a third mask; and forming a pixel electrode connected to the drain electrode, passing through the organic insulating film and the transmission hole and forming a reflective electrode exposing the pixel electrode of the transmission hole on the pixel electrode using a fourth mask.

BRIEF DESCRIPTION OF THE DRAWINGS

These and other features of the invention will be apparent from the following detailed description of the embodiments of the present invention with reference to the accompanying drawings, in which:

FIGS. 3A and 3B are sectional views illustrating the transflective thin film transistor substrate taken along the line II-II', III-III, IV-IV' shown in FIG. 2;

FIGS. 4A and 4B are a plan view and a sectional view describing a first mask process of the transflective thin film transistor substrate according to the embodiment of the present invention;

FIGS. 7A and 7B are a plan view and a sectional view describing a fourth mask process of the transflective thin film transistor substrate according to the embodiment of the present invention;

FIGS. 8A to 8F are sectional views for illustrating the fourth mask process according to the present invention using a half-tone mask;

DETAILED DESCRIPTION OF THE ILLUSTRATED EMBODIMENTS

Reference will now be made in detail to embodiments of the present invention, examples of which are illustrated in the accompanying drawings.

Hereinafter, the embodiments of the present invention will be described in detail with reference to FIGS. 2 to 15B.

Figure 1:
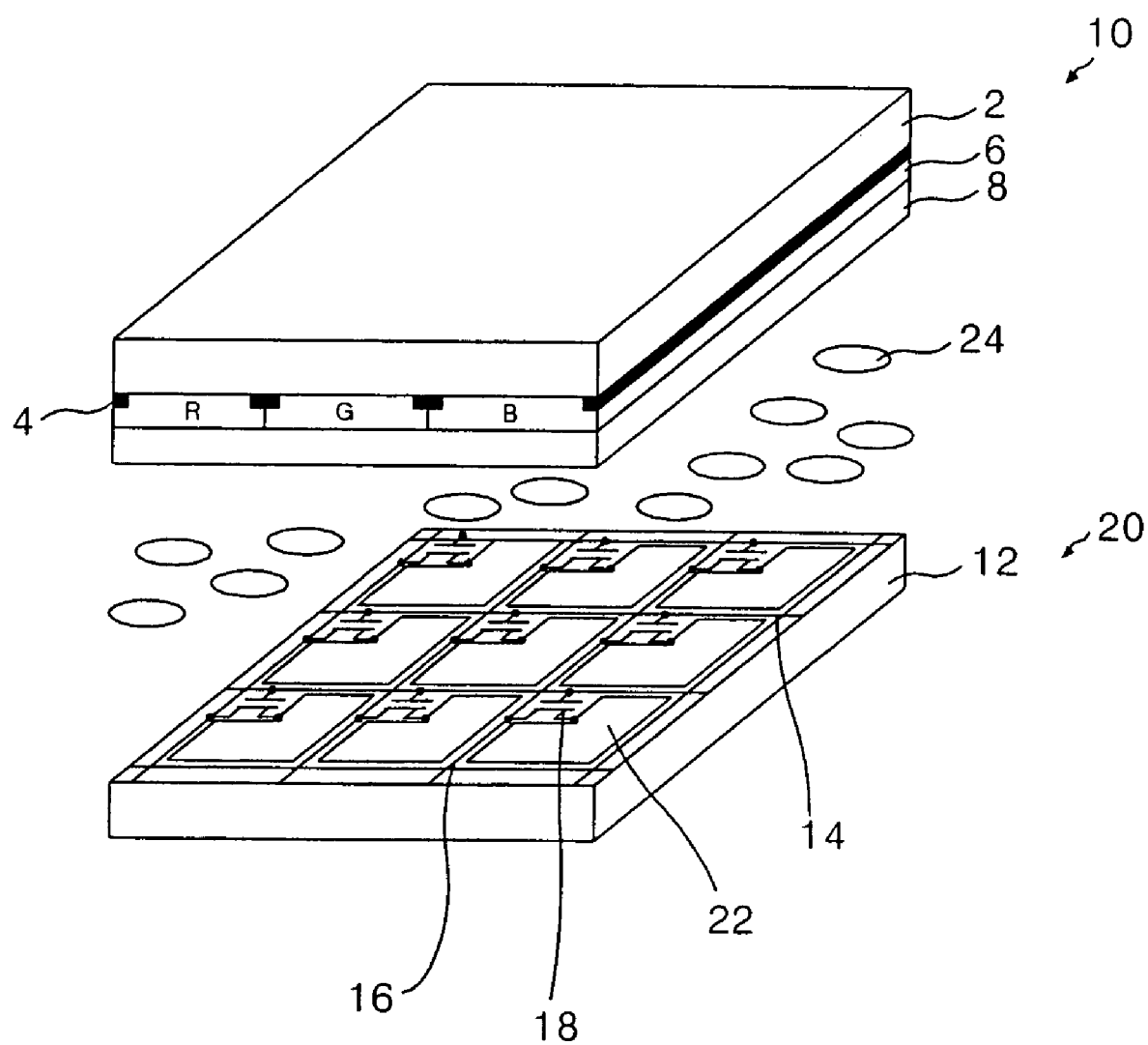
FIG. 1 is a perspective view illustrating a structure of a related art liquid crystal display panel.
Figure 2:
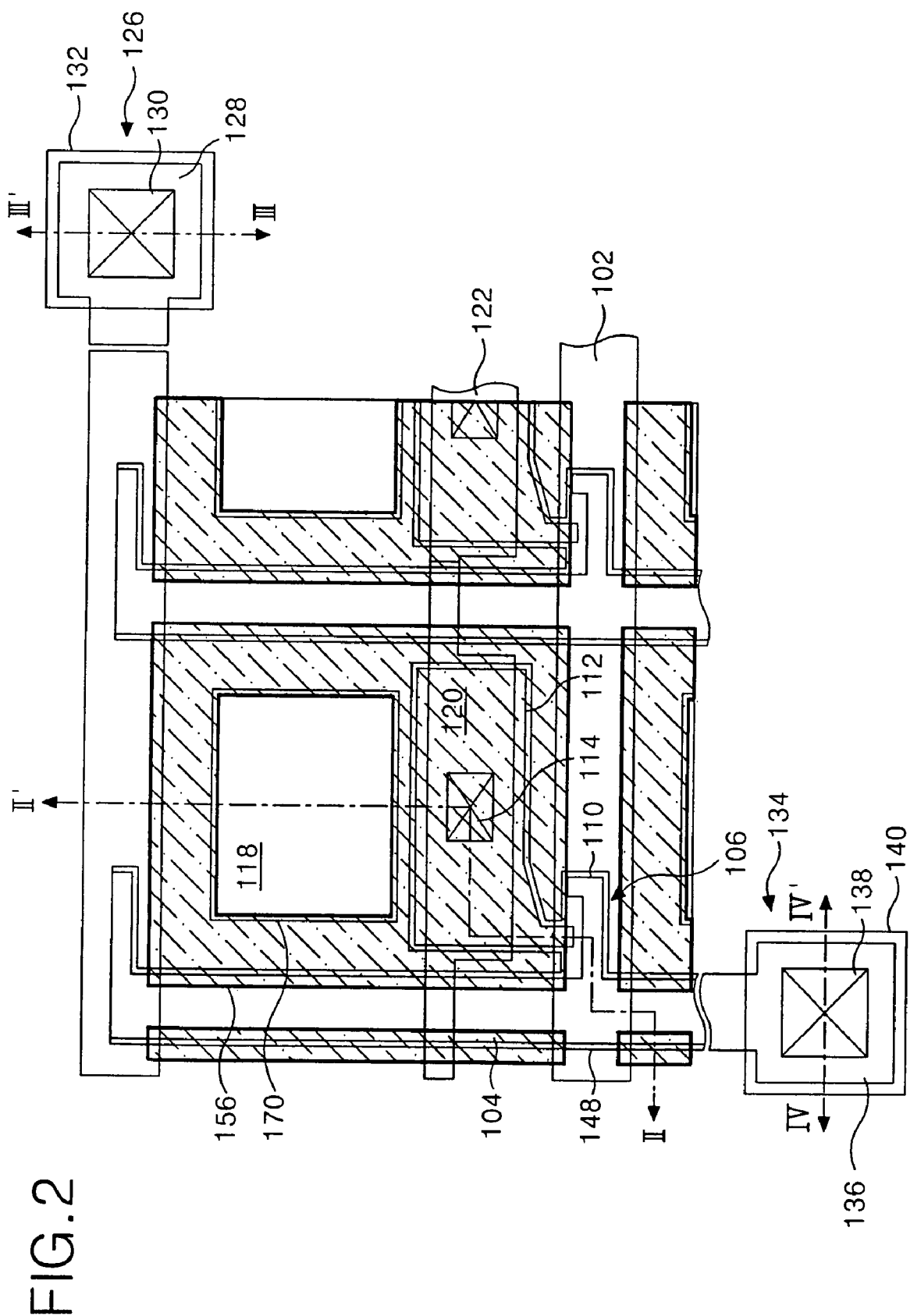
FIG. 2 is a plan view partially illustrating a part of a transflective thin film transistor substrate according to an embodiment of the present invention.

FIG. 2 is a plan view illustrating a transflective thin film transistor substrate according to the first embodiment of the present invention, and FIGS. 3A and 3B are sectional views illustrating the transflective thin film transistor substrate taken along the lines II-II', III-III, IV-IV' shown in FIG. 2.

In FIGS. 2 and 3, the transflective thin film transistor substrate includes: a gate line 102 and a data line 104 that define a pixel area on a lower substrate 142 by crossing each other with a gate insulating film 144 therebetween; a thin film transistor 106 connected to the gate line 102 and the data line 104; a pixel electrode 118 formed at each pixel area and connected to the thin film transistor 106; and a reflection electrode 156 formed to overlap the pixel electrode 118 at a reflection area of each pixel. Accordingly, each pixel area is divided into a reflection area, having the reflection electrode 156 and the pixel electrode 118, and a transmission area, having the pixel electrode 118 exposed through an open part.

The thin film transistor 106 responds to the scan signal of the gate line 102 to maintain a pixel signal supplied to the data line 104 For this, the thin film transistor 106 includes the gate line 102, a source electrode 110 connected to the data line 104, a drain electrode 112 that faces the source electrode 110 and is connected to the pixel electrode 118, an active layer 116 which overlaps the gate line 102 with the gate insulating film 144 to form a channel between the source electrode 110 and the drain electrode 112, and an ohmic contact layer 146 making an ohmic contact with the active layer 116, the source electrode 110 and the drain electrode 112 except a channel part.

And, a semiconductor pattern 148 including the active layer 116 and the ohmic contact layer 146 is formed to overlap the data line 104.

The pixel electrode 118 is formed at each pixel area defined by the crossing of the gate line 102 and the data line 104. More specifically, the pixel electrode 118 is formed on an organic insulating film 154 of each pixel area to pass through a drain contact hole 114 passing through the organic insulating film 154 and the passivation film 150 and a transmission hole 170 passing through from the organic insulating film 154 and the gate insulating film 144. Accordingly, the pixel electrode 118 is connected to the drain electrode 112 via the drain contact hole 114 and is connected to the substrate 142 via the transmission hole 170. Further, the pixel electrode 118 is overlapped by the reflection electrode 156 formed on the pixel electrode 118 in the reflection area, and is exposed via an open part of the reflection electrode 156 to transmit light in the transmission area. The pixel electrode 118 generates a potential difference with the common electrode of the color filter substrate (not shown) by the pixel signal supplied through the thin film transistor 106. The liquid crystal material having dielectric anisotropy rotates by this potential difference to control the transmissivity of the light which goes through the liquid crystal layer of each of the reflection area and the transmission area, thus the brightness becomes different in accordance with the video signal.

The reflection electrode 156 is formed at the reflection area of each pixel to reflect an external light. More specifically, the reflection electrode 156 defines the transmission area by exposing the pixel electrode 118 formed in the transmission hole 170 and defines the reflection area by overlapping the remaining part of the pixel electrode 118, in which the remaining part of the pixel electrode 118 surrounds the transmission area. And, the reflection electrode 156 is formed to be separated from the reflection electrode 156 of an adjacent pixel on the signal line such as the data line 104 and the gate line 102. In this arrangement, the reflection electrode 156 has an edge part identical to that of the pixel electrode 118, or has an edge part located at a slightly inner side from the edge part of the pixel electrode 118. The reflection electrode 156 has an embossing shape along the surface of the organic insulating film 154 together with the pixel electrode 118, thus its reflection efficiency increases due to its dispersion effect.

Herein, the transmission hole 170 is formed to pass through a relatively thick organic insulating film 154, a passivation film 150 and the gate insulating film 144 under the organic insulating film 154. Accordingly, the length of the light path that runs through the liquid crystal layer becomes the same at the reflection area and the transmission area. Thus, the transmission efficiency of the reflection mode and the transmission mode becomes the same.

The thin film transistor substrate of the present invention further includes a storage capacitor 120 connected to the drain electrode 112 in order to stably maintain a video signal supplied to the pixel electrode 118. An enlarged drain electrode 112 overlaps the storage line 122 substantially parallel to the gate line 102 with the gate insulating film 144 therebetween to form the storage capacitor 120. Accordingly, the semiconductor pattern 148 is further overlapped under the drain electrode 112 overlapping the storage line 122. And, the pixel electrode 118 is connected to the drain electrode 112 via the contact hole 114 on the storage line 122.

The gate line 102 is connected to a gate driver (not shown) through the gate pad 126. The gate pad 126 includes a lower gate pad electrode 128 extended from the gate line 102 and an upper gate pad electrode 132 connected to the lower gate pad electrode 128 via a first contact hole 130 passing from the organic insulating film 154 to the gate insulating film 144.

The data line 104 is connected to a data driver (not shown) through the data pad 134. The data pad 134 is formed with the structure like the gate pad 126 described above. More specifically, the data pad 134 includes a lower data pad electrode 136 formed on the substrate 142 and an upper data pad electrode 140 connected to the lower data pad electrode 136 via a second contact hole 138 passing from the organic insulating film 154 to the gate insulating film 144. The lower data pad electrode 136 of the data pad 134 is connected to the data line 104, formed together with the semiconductor pattern 148 on the gate insulating film 144, through a separate contact electrode (not shown).

Herein, the passivation film 150 shown in FIG. 3A can be omitted as shown in FIG. 3B.

The thin film transistor according to the embodiment of the present invention with such a composition is formed by the following four mask processes.

Figure 4B:
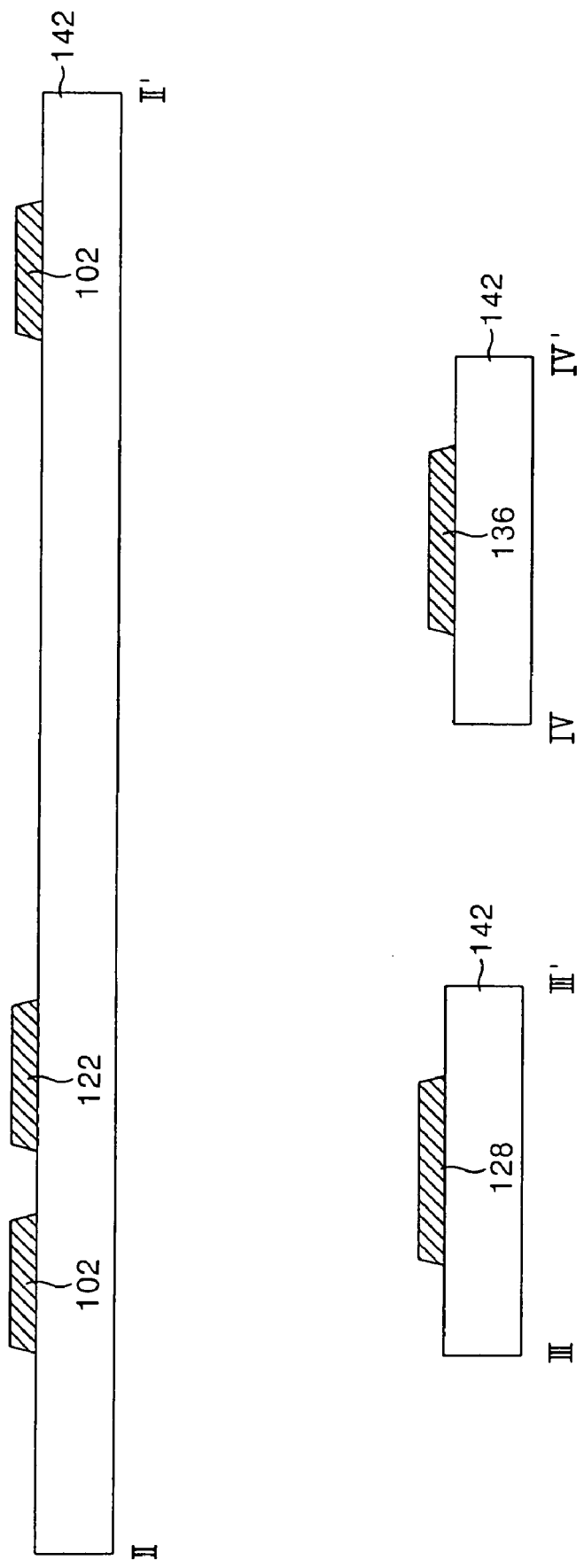

FIGS. 4A and 4B are a plan view and a sectional view explaining a first mask process of fabricating method of the thin film transistor substrate according to the embodiment of the present invention.

A gate pattern is formed by a first mask process, wherein the gate pattern includes the gate line 102, the storage line 122, the lower gate pad electrode 128 connected to the gate line 102, and the lower data pad electrode 136, on the lower substrate 142.

More specifically, a gate metal layer is formed by a deposition method such as sputtering. The gate metal layer is formed in a single layer structure of, for example, Mo, Cu, Al, Ti, Cr, Mo alloy, Al alloy such as AlNd, or Cu alloy. Or, the gate metal layer may be formed in a structure having a plurality of layers more than a double structure such as Al/Cr, Al/Mo, Al(Nd)/Al, Al(Nd)/Cr, Mo/Al(Nd)Mo, Cu/Mo, Ti/Al(Nd)/Ti, Mo/Al, Mo/Ti/Al(Nd), Cu alloy/Mo, Cu alloy/Al, Cu alloy/Mo alloy, Cu alloy/Al alloy, Al/Mo ally, Mo alloy/Al, Al alloy/Mo alloy, Mo alloy/Al alloy. Subsequently, the gate metal layer is patterned by a photolithography process using the first mask and an etching process, to thereby form a gate metal pattern including the gate line 102, the storage electrode 122, the lower gate pad electrode 128, and the lower data pad electrode 136.

Figure 5A:
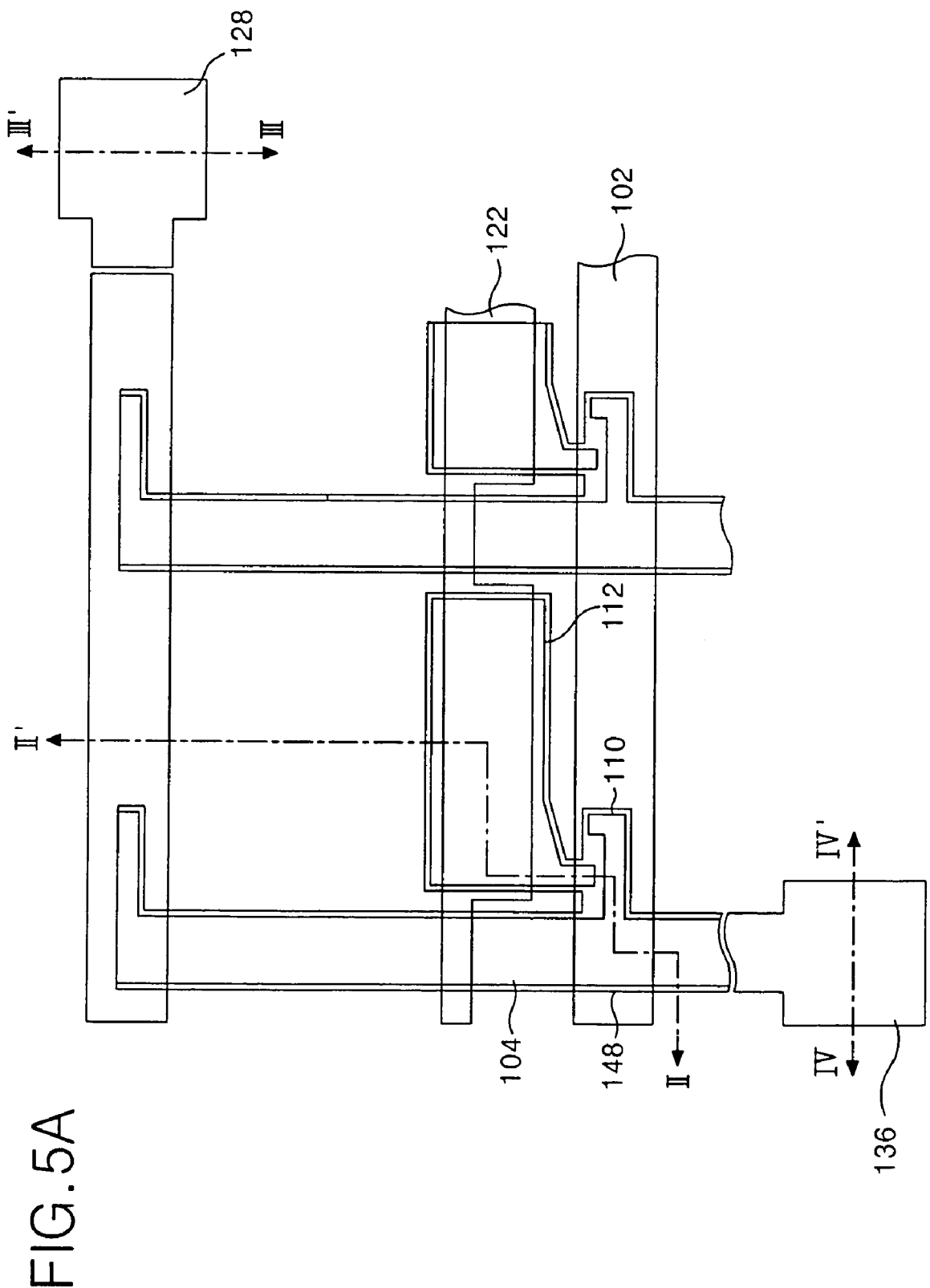
FIGS. 5A and 5B are a plan view and a sectional view describing a second mask process of the transflective thin film transistor substrate according to the embodiment of the present invention.
Figure 5B:
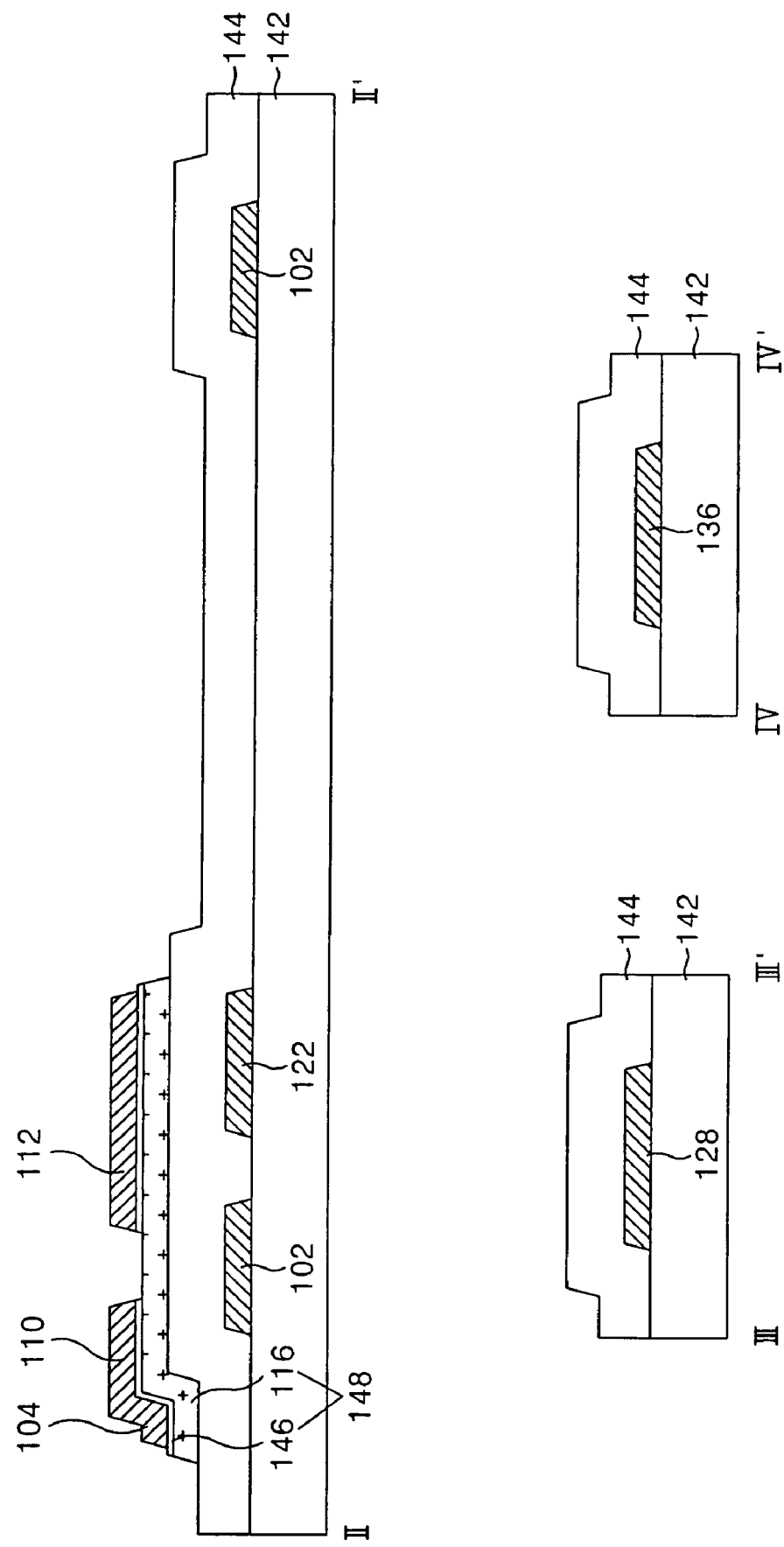

FIGS. 5A and 5B are a plan view and a sectional view illustrating a second mask process of the transflective thin film transistor substrate according to the embodiment of the present invention.

The gate insulating film 144 is formed on the lower substrate 142 where the gate metal pattern is formed. And, a source/drain pattern including the data line 104, the source electrode 110 and the drain electrode 112, and a semiconductor pattern 148 including the active layer 116 and the ohmic contact layer 146 that overlap along the rear surface of the source/drain pattern are formed on the gate insulating film 144 by a second mask process. The semiconductor pattern 148 and the source/drain pattern are formed by one mask process using a diffractive exposure mask or a half-tone mask. Hereinafter, for example, an example using the diffractive exposure mask will be described as follows.

Specifically, the gate insulating film 144, an amorphous silicon layer, an amorphous silicon layer doped with impurities n+ or p+, and a source/drain metal layer are sequentially formed on the lower substrate 142 where the gate pattern is formed. For example, the gate insulating film 144, the amorphous silicon layer, the amorphous silicon layer doped with impurities are formed by PECVD, and the source/drain metal layer is formed by sputtering. The gate insulating film 144 may be formed of inorganic insulating material such as silicon oxide SiOx, silicon nitride SiNx, and the source/drain metal layer is formed in a single structure of Mo, Cu, Al, Ti, Cr, Mo alloy, Al alloy such as AlNd, or Cu alloy. Or, the gate insulating film 144 may be formed as a structure having a plurality of layer, for example, structure more than a double structure such as Al/Cr, Al/Mo, Al(Nd)/Al, Al(Nd)/Cr, Mo/Al(Nd)Mo, Cu/Mo, Ti/Al(Nd)/Ti, Mo/Al, Mo/Ti/Al(Nd), Cu alloy/Mo, Cu alloy/Al, Cu alloy/Mo alloy, Cu alloy/Al alloy, Al/Mo ally, Mo alloy/Al, Al alloy/Mo alloy, Mo alloy/Al alloy.

And a photo-resist pattern having a stepped difference is formed on the source/drain metal layer by a photolithography process using a diffractive exposure mask. The photo-resist pattern has a relatively thicker thickness at an area where the semiconductor pattern and the source/drain pattern should be formed and a relatively thinner thickness at an area where the channel of the thin film transistor is formed.

A source/drain metal pattern and the semiconductor pattern thereunder are formed by an etching process using the photo-resist pattern having the stepped difference. Herein, the source/drain pattern includes the data line 104, and the drain electrode 112 integrated with the source electrode 110.

And then, the thin part of the photo-resist pattern is removed and the thick part of the photo-resist pattern becomes thinner, by an ashing process. By an etching process using the ashed/photo-resist pattern, the source electrode 110 is separated from the drain electrode 112, and the ohmic contact layer 146 under the source electrode 110 and the drain electrode 112 is eliminated. Subsequently, the photo-resist pattern remaining on the source/drain metal pattern is removed by a strip process.

Figure 6A:
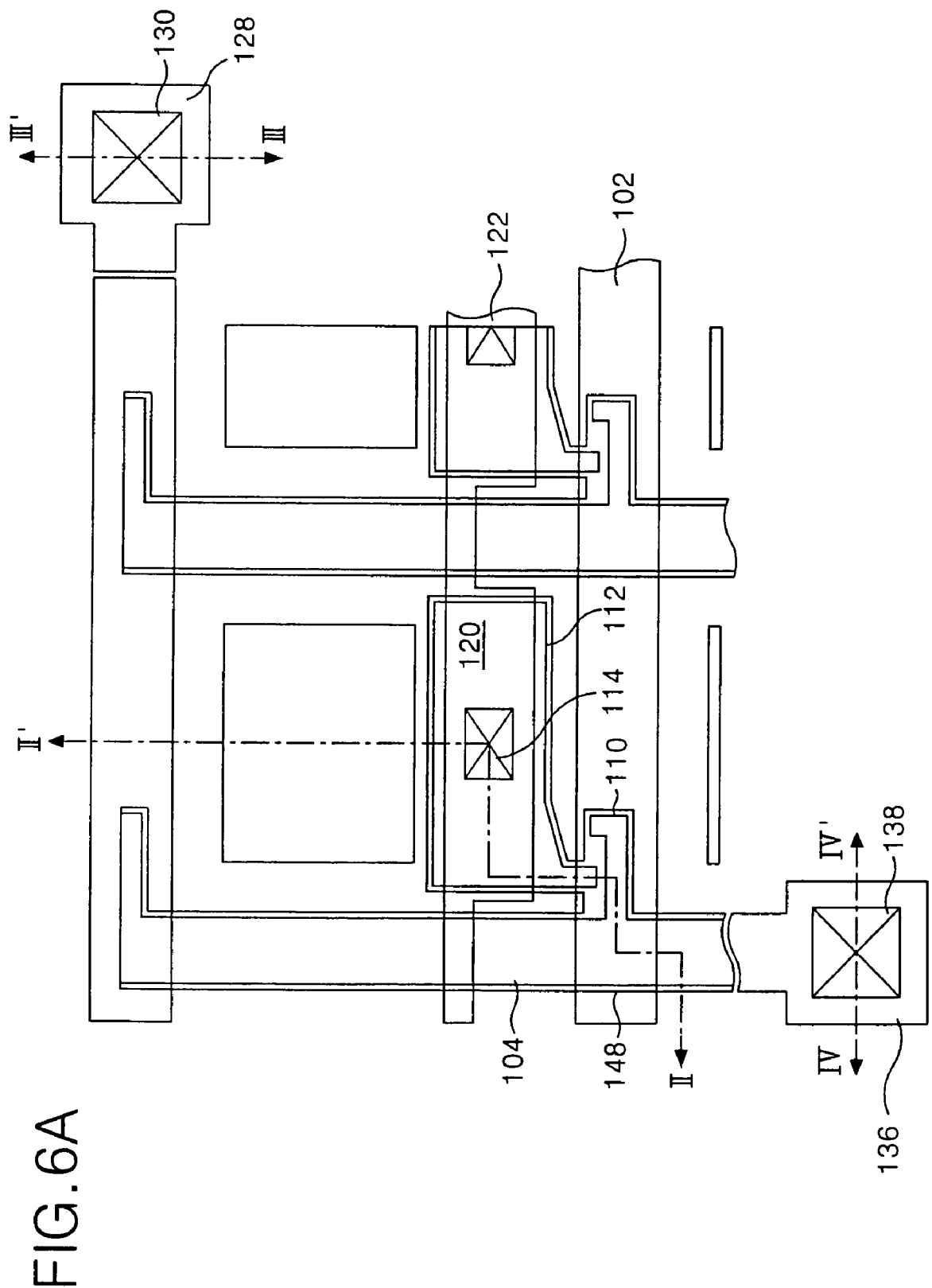
FIGS. 6A and 6B are a plan view and a sectional view describing a third mask process of the transflective thin film transistor substrate according to the embodiment of the present invention.
Figure 6B:
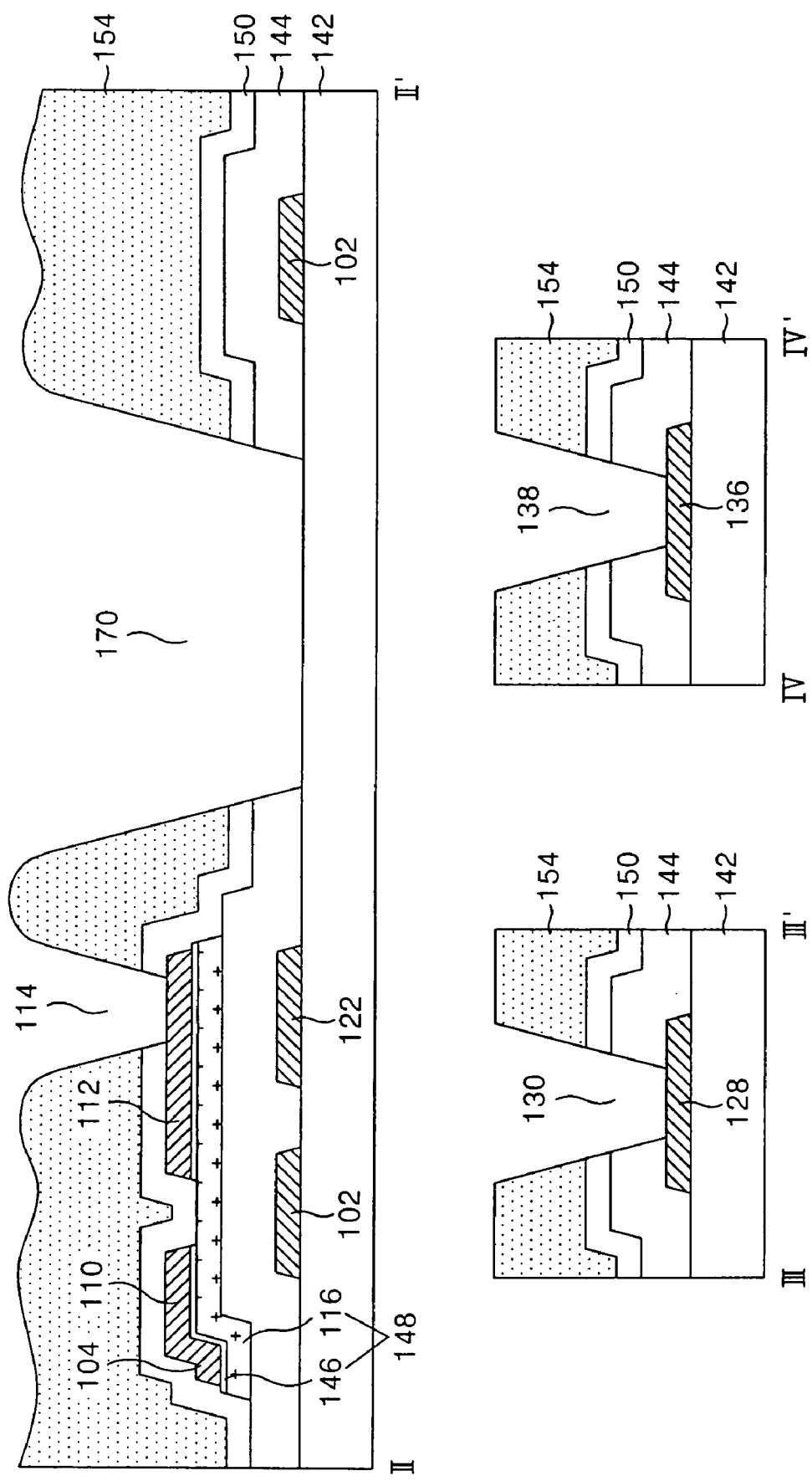

FIGS. 6A and 6B are a plan view and a sectional view illustrating a third mask process of the transflective thin film transistor substrate according to the embodiment of the present invention.

The passivation film 150 and the organic insulating film/154, which cover the source/drain metal pattern, are formed, and the transmission hole 170, the drain contact hole 114, the first contact hole 130 and the second contact hole 138, passing through the passivation film 150 and the organic film 154, are formed, by use of the third mask process. Herein, the passivation film 150 can be omitted.

Specifically, passivation film 150 is formed by the deposition method such PECVD on the gate insulating film 144 where the source/drain metal pattern is formed. The passivation film 150 is formed of an inorganic insulating material similar to the gate insulating film 144.

Subsequently, the organic insulating film 154, having an embossing surface at the reflection area and having the transmission hole 170, the drain contact hole 114, the first contact hole 130 and the second contact hole 138, are formed on the passivation film 150. The organic insulating film 154 is formed on the passivation film 150 by coating a photosensitive organic material such as acrylic resin by use of a spin coating method. And then, the organic insulating film 154 is patterned by the photolithography process using the third mask, thereby forming the transmission hole 170, the drain contact hole 114, the first contact hole 130 and the second contact hole 138 which pass through the organic film 154 and correspond to the transmission part of the third mask. Further, the third mask has a structure where a shielding part and a diffractive exposure part(or a transflective part) repeat at the rest area except for the transmission part. The organic insulating film 154 in correspondence to the above repeat structure is patterned to have a structure that a shielding area (projected part) and a diffractive exposure area (groove part), having a stepped difference at the reflection area, are repeated. Subsequently, the organic insulating film 154 where the projected part and the groove part are repeated is cured so that the surface of the organic insulating film 154 has the embossing shape.

The passivation film 150 and the gate insulating film 144 under the organic film 154 are patterned by using the organic insulating film 154 as a mask, so that the transmission hole 170, the first contact hole 130 and the second contact hole 138 are extended to pass through the gate insulating film 144, and the drain contact hole 114 is extended to pass through the passivation film 150.

Figure 7A:
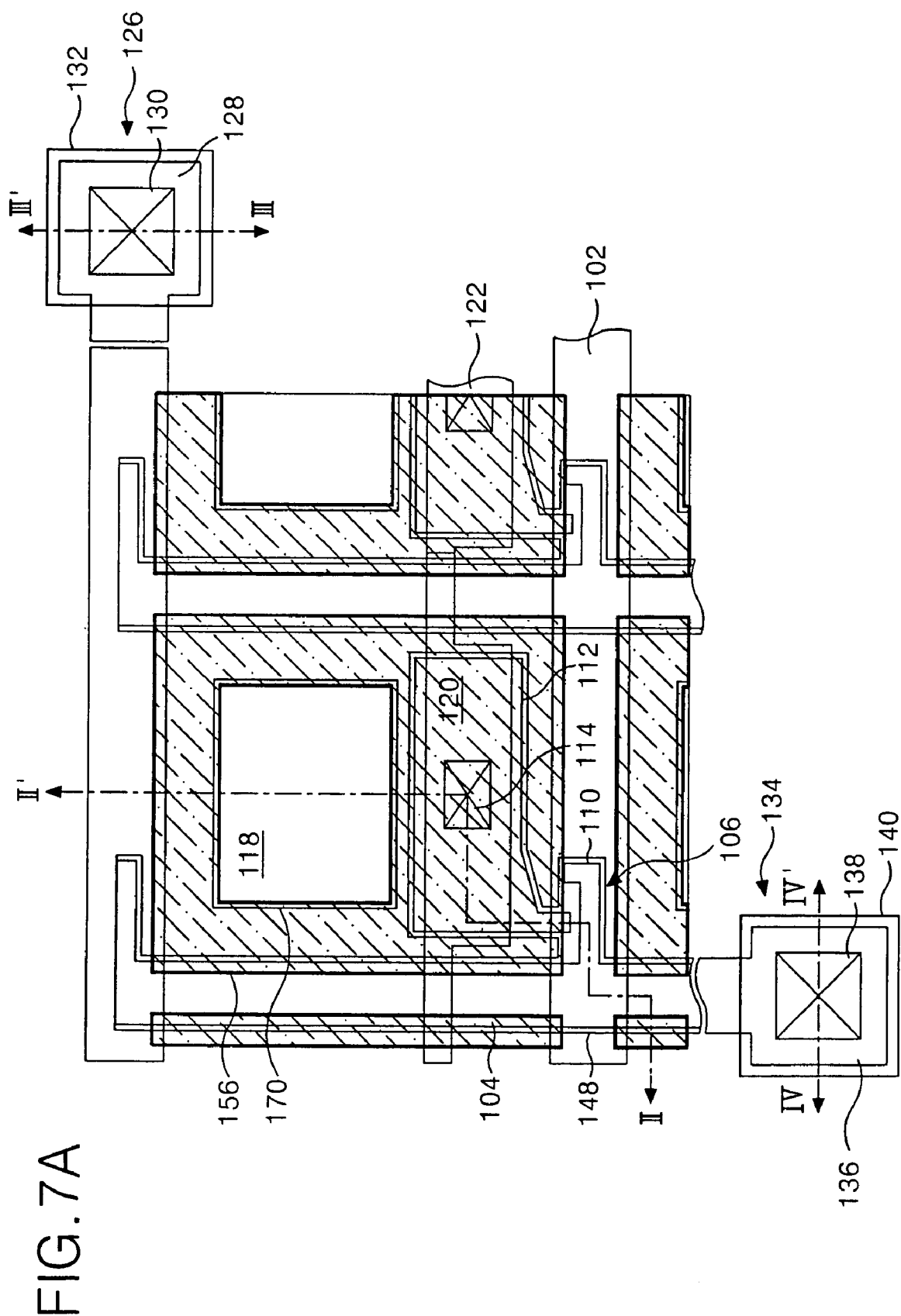

FIGS. 7A and 7B are a plan view and a sectional view illustrating a fourth mask process of the transflective thin film transistor substrate according to the embodiment of the present invention, and FIGS. 8A to 8F are sectional views for specifically explaining the fourth mask process according to the present invention using a half-tone mask.

A transparent conductive pattern, including the pixel electrode 118, the upper gate pad electrode 132 and the upper data pad electrode 140, and a reflection electrode 156 are formed on the organic insulating film 154 having the embossing shape, by use of the fourth mask process. The transparent conductive pattern and the reflection electrode 156 are formed by a diffractive exposure mask, a half-tone mask, and a partial transmission mask.

Figure 8B:
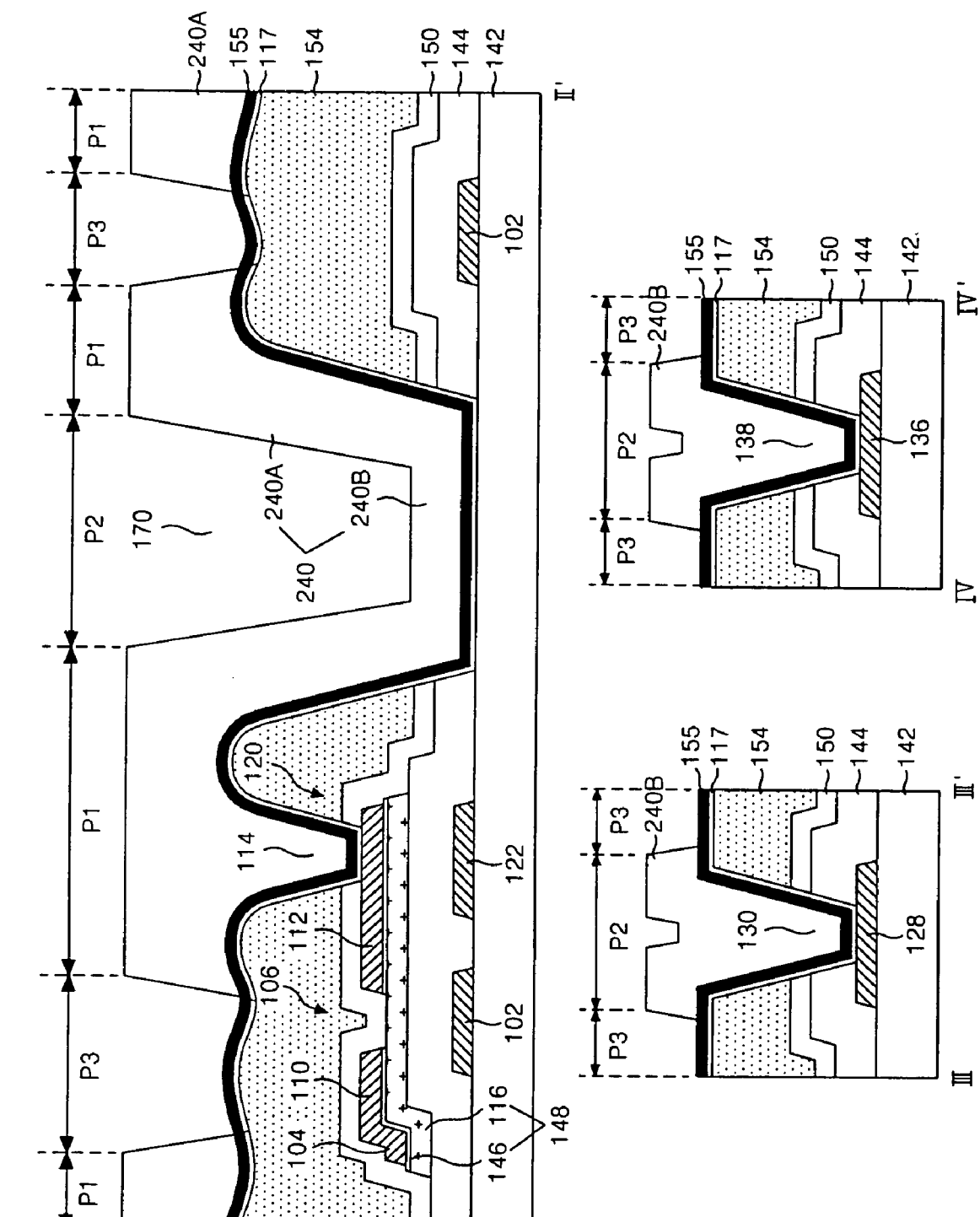

In FIG. 8A, a transparent conductive film 117 and a reflection metal layer 155 to cover the organic insulating film 154 are deposited by a deposition method such as sputtering. The transparent conductive film 117 may be formed of ITO, TO, IZO, ITZO and the like, and the reflection metal layer 155 may be formed of a metal having a high reflexibility like Al and AlNd. The transparent conductive film 117 may be formed in a double layered structure such as AlNd/Mo and the like. Subsequently, a photo-resist 239 is applied to the reflection metal layer 155, and then, is exposed by a photolithography process using a half-tone mask 230 and developed, to thereby form a photo-resist pattern 240 having a stepped difference as shown in FIG. 8B.

Specifically, the half-tone mask 230 includes a quartz substrate 232, and a half-tone transmission layer 236 and a shielding layer 234 formed on the quartz substrate 232. The shielding layer 234 is formed of a metal such as Cr and CrOx, and the half-tone transmission layer 236 is formed of MoSiX. Herein, a shielding part P1, where the half-tone transmission layer 236 and the shielding part 234 overlap, intercepts ultra violet UV light. Thus, a first photo-resist pattern 240B remains at an area, where both the reflection metal layer 155 and the transparent conductive film 117 should be existed, as shown in FIG. 8B. A partial transmission part P2, where the half-tone transmission layer 236 is located, partially transmits the ultra violet UV light. Thus, a second photo-resist pattern 240B remains that is thinner than the first photo-resist pattern 240A where only transparent conductive film 117 should be existed. And, a full transmission part P3, where the quartz substrate 232 is exposed, transmits the entire ultra violet UV light, so that a photo-resist pattern 240 does not exist at an area, where both the reflection metal layer 155 and the transparent conductive film 117 should be removed, as shown in FIG. 8B.

In FIG. 8C, the reflection metal layer 155 and the transparent conductive film 117 are patterned by an etching process using the photo-resist pattern 240 as a mask, e.g., by an wet etching process, to thereby form a transparent conductive pattern including the pixel electrode 118, the upper gate pad electrode 132 and the upper data pad electrode 140, and a reflection electrode 156, overlapping the pixel electrode. Herein, the pixel electrode 118 and the reflection electrode 156 have the same edge part. The pixel electrode 118 and the reflection electrode 156 are formed to overlap the organic insulating film 154 which passes through the transmission hole 170 at the pixel area. And the pixel electrode 118 and the reflection electrode 156 are connected to the drain electrode 112 which passing through the drain contact hole 114. Since the surface of the organic insulating film 154 has an embossing shape, the pixel electrode 118 and the reflection electrode 156 formed on the organic insulating film 154 have an embossing shape. The upper gate pad electrode 132 and the upper data pad electrode 140 are respectively connected to the lower gate pad electrode 128 and the lower data pad electrode 136 via the first and the second contact holes 130 and 138.

In FIG. 8D, a thickness of the first photo-resist pattern 240A, and the second photo-resist pattern 240B is removed, by an ashing process.

In FIG. 8E, the exposed reflection electrode 156 is etched by an wet etching process using the ashed first photo-resist pattern 240A as a mask, to thereby expose the pixel electrode 118 in the transmission hole 170, the upper gate pad electrode 132, and the upper data pad electrode 140. At this time, the edge part of the reflection electrode 156 on the pixel electrode 118 is exposed to be etched along the ashed first photo-resist pattern 240A. Accordingly, the edge part of the reflection electrode 156 may be located at inner side from the edge part of the pixel electrode 118.

In FIG. 8F, the first photo-resist pattern 240A left on the reflection electrode 156 in FIG. 8E is removed by a strip process.

Figure 9:
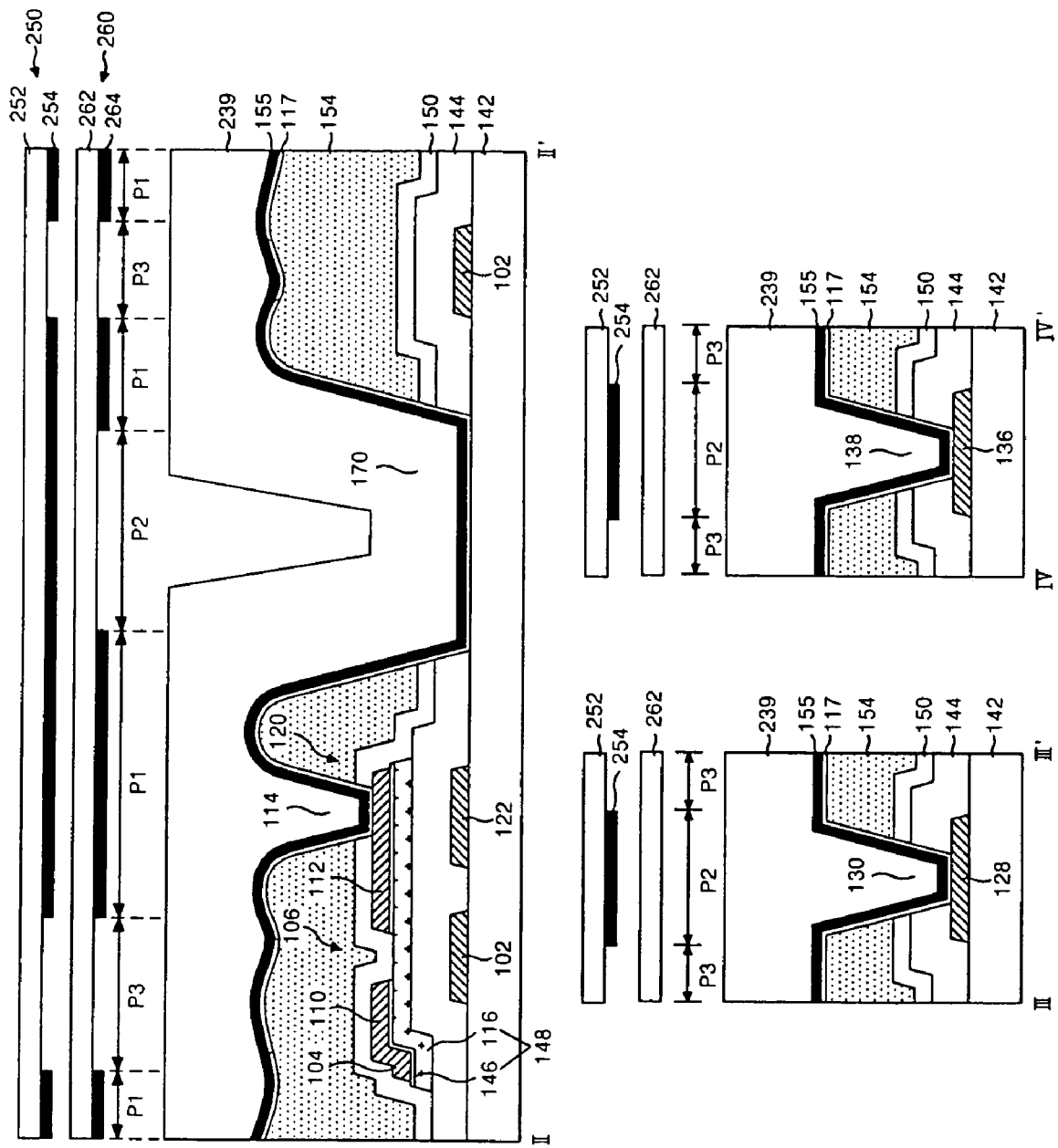
FIG. 9 is a sectional view for illustrating the use of a partial exposure mask in the fourth mask process of the present invention.

The photo-resist pattern 240 including the first and the second photo-resist patterns 240A and 240B, having thicknesses different from each other, as shown in FIG. 8B may be formed by an exposure method, which continually use two masks, i.e., a partial exposure mask, using under exposure as shown in FIG. 9.

In FIG. 9, a first partial exposure mask 250 includes a quartz substrate 252 and a shielding layer 254 partially formed on the quartz substrate 252. A second partial exposure mask 260 includes a quartz substrate 262 and a shielding layer 264 partially formed on the quartz substrate 262. A photo-resist 239 is continually exposed twice by sequentially using the first and the second partial exposure masks 250 and 260. Accordingly, a developer reaction amount of the photo-resist 239 is differentiated by a sum of exposure amount of two times, to thereby form a first and a second photo-resist pattern 240A and 240B, which have thicknesses different from each other.

Specifically, a shielding part P1, where shielding layers 254 and 264 of the first and the second partial exposure masks 250 and 260 are located, entirely intercepts ultra violet UV light in exposure of two times, to thereby remain the first photo-resist pattern 240A at an area, where both the reflection metal layer 155 and the transparent conductive film 117, as shown in FIG. 8B. A partial transmission part P2, where only shielding layer 254 of the first partial exposure mask 250 is located, transmits only a second ultra violet UV light in exposure of two times, to thereby remain the second photo-resist pattern 240B thinner than the first photo-resist pattern 240A at an area, where only the transparent conductive film 117 exists, as shown in FIG. 8B. And, a full transmission part P3, where the quartz substrates 252 and 262 of the first and the second exposure masks 250 and 260 are located, transmits the entire ultra violet UV light in exposure of two times, so that a photo-resist pattern 240 does not exist at an area, where both the reflection metal layer 155 and the transparent conductive film 117 should be removed, as shown in FIG. 8B.

Accordingly, the method of fabricating the transflective thin film transistor substrate according to the embodiment of the present invention is possible to simplify processes by performing four mask processes.

Figure 10:
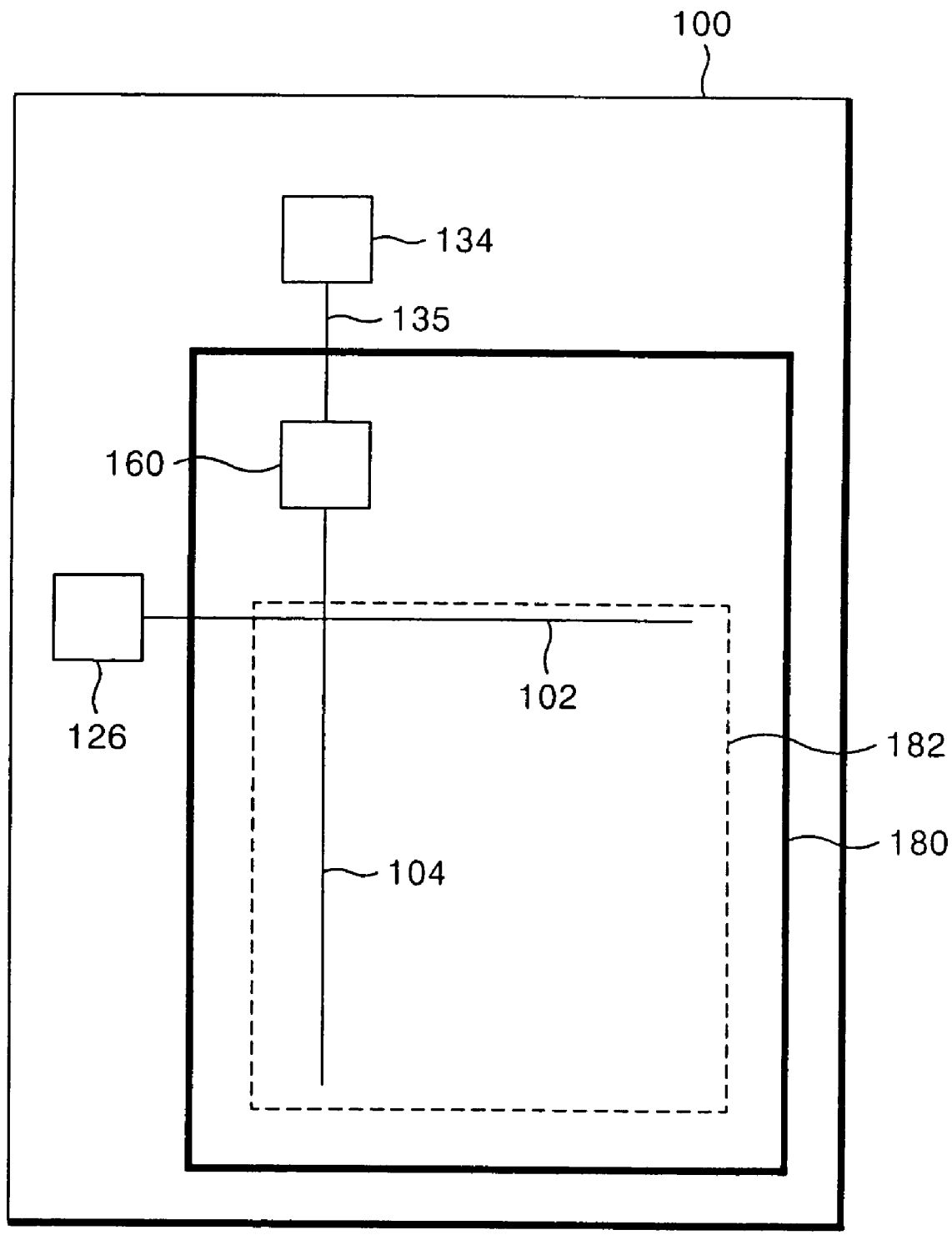
FIG. 10 is a plan view briefly illustrating the transflective thin film transistor substrate according to the embodiment of the present invention, with a surrounding part centered.

FIG. 10 is a plan view briefly illustrating the transflective thin film transistor substrate according to the present invention, with a surrounding part.

The transflective thin film transistor substrate 100 shown in FIG. 10 includes a contact electrode 160 in order to connect the data pad 134 formed in the same layer as the gate pad 126 to the data line 104. In other words, the contact electrode 160 connects a data link 135 extended from the data pad 134, to the data line 104. Herein, the contact electrode 160 is formed of the same metal layer as the pixel electrode 118 formed at an active area 182, is formed of the same reflection metal layer as the reflection electrode 156, or may be formed in a double layered structure in which the transparent conductive film and the reflection metal layer are stacked. Herein, if the contact electrode 160 is formed of the reflection metal layer to be exposed to an exterior, then there occurs a problem that the contact electrode 160 is corroded. Thus, it is located at an area which is sealed by a sealant 180, i.e., between the sealant 180 and an active area 182. Accordingly, it is possible to prevent the corrosion of the contact electrode 160.

Figure 11A:
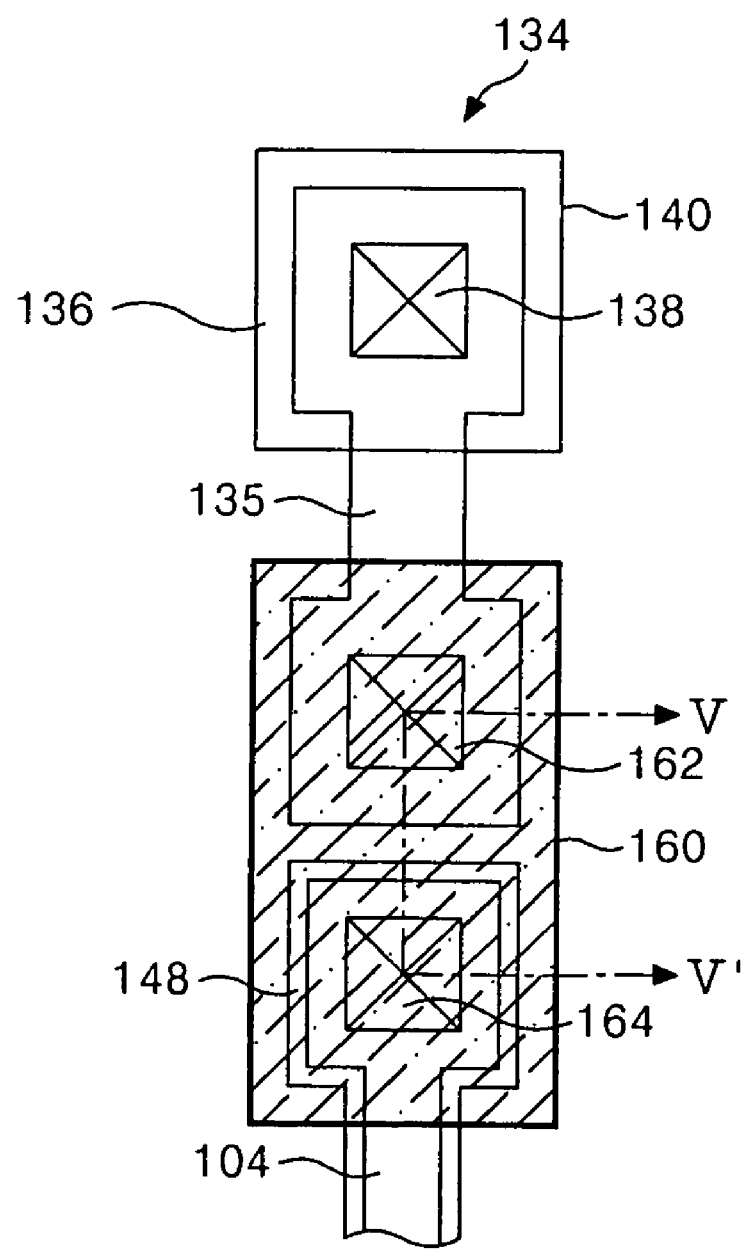
FIGS. 11A to 11C are a plan view and sectional view specifically illustrating a contact area of a data link and a data line shown in FIG. 10.
Figure 11B:
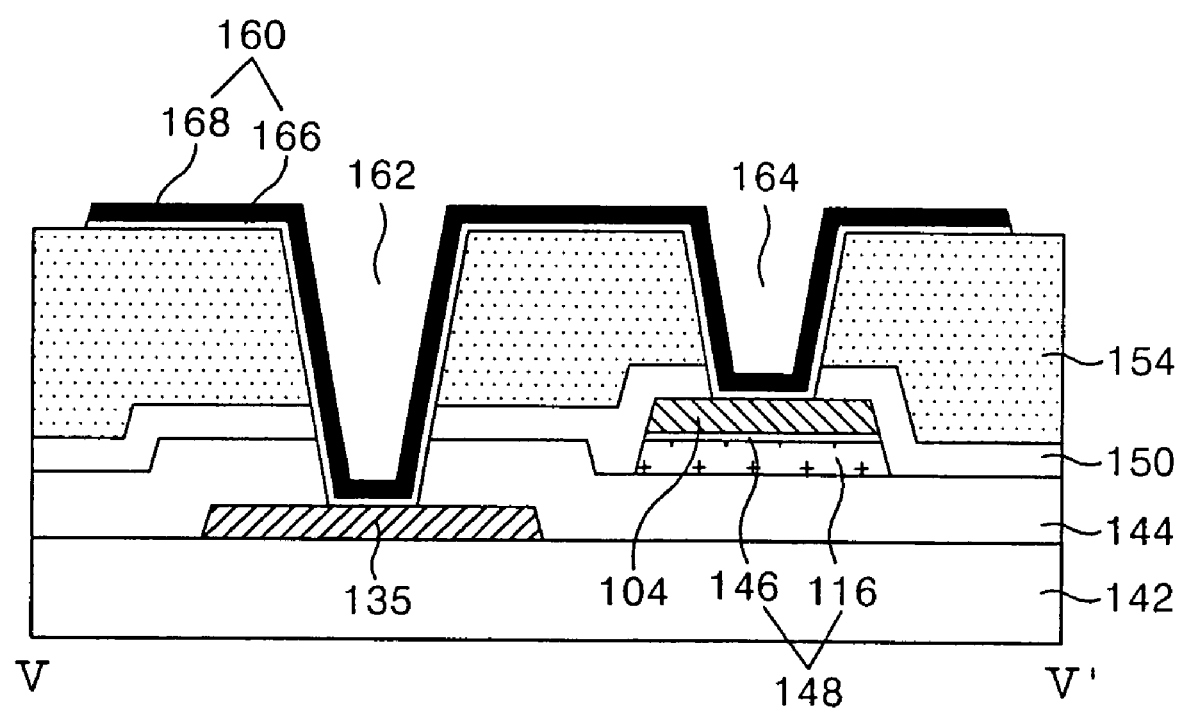
Figure 11C:
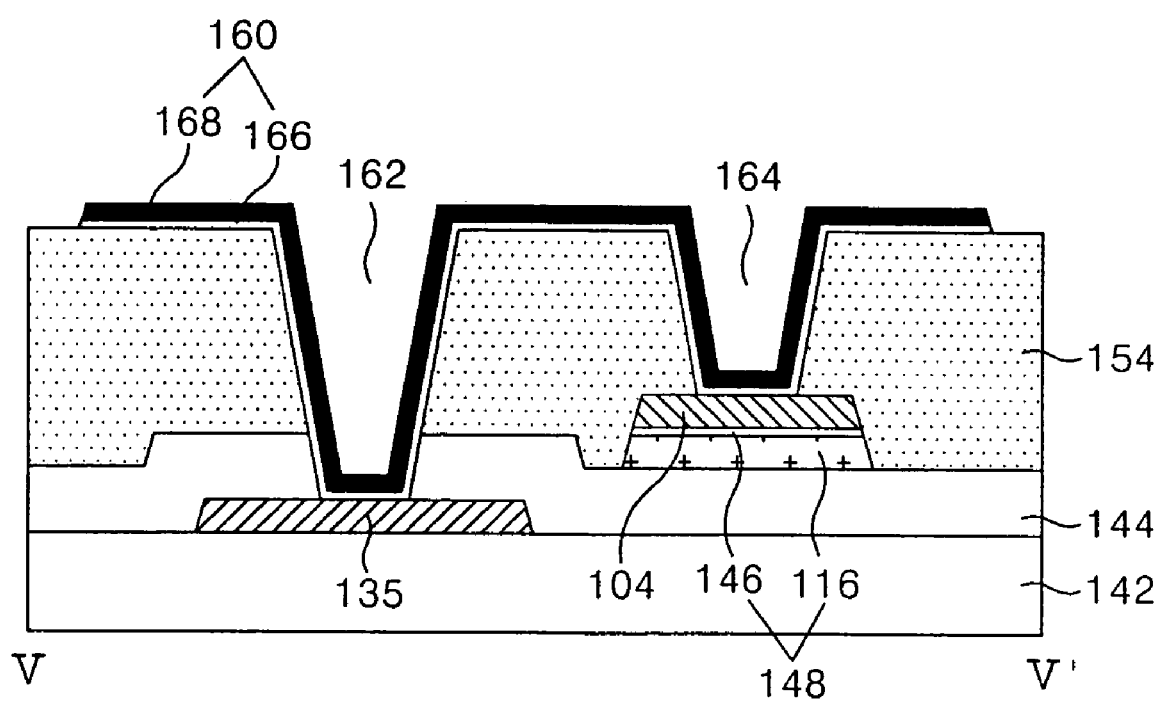

FIG. 11A is an enlarged plan view illustrating a contact area of the data line 104 and a data link 135, FIGS. 11B and 11C are sectional views illustrating the contact area taken along the line V-V'.

In FIGS. 11A and 11B, the data link 135 is adjacent to the data line 104 or overlapped with the data line 104. Herein, the data line 104 is extended from the data pad 134, i.e., the lower data pad electrode 136 and is located at the area which is to be sealed by the sealant 180.

A third contact hole 162 passes through the organic insulating film 154 to the gate insulating film 144 to expose the data link 135, and a fourth contact hole 164 passes through the organic insulating film 154 and the passivation film 150 to expose the data line 104.

The contact electrode 160 includes a first contact electrode 166 formed of the transparent conductive film similar to the upper data pad electrode 140 and a second contact electrode 168 formed of the reflection metal layer to capture the first contact electrode 166. Differently from this, the contact electrode 160 can be formed of only the first contact electrode 166, or can be formed of only the second contact electrode 168. The contact electrode 160 connects the data link 135 to the data line 104 via the third and the fourth contact hole 162 and 164.

The passivation film 150 shown in FIG. 11B can be omitted as shown in FIG. 11C.

The surrounding part of the transflective thin film transistor, i.e., the contact area of both the data line 104 and the data link 135, is formed by performing the fourth mask process as described above. This will be described with reference to FIGS. 12A to 15B.

Figure 12A:
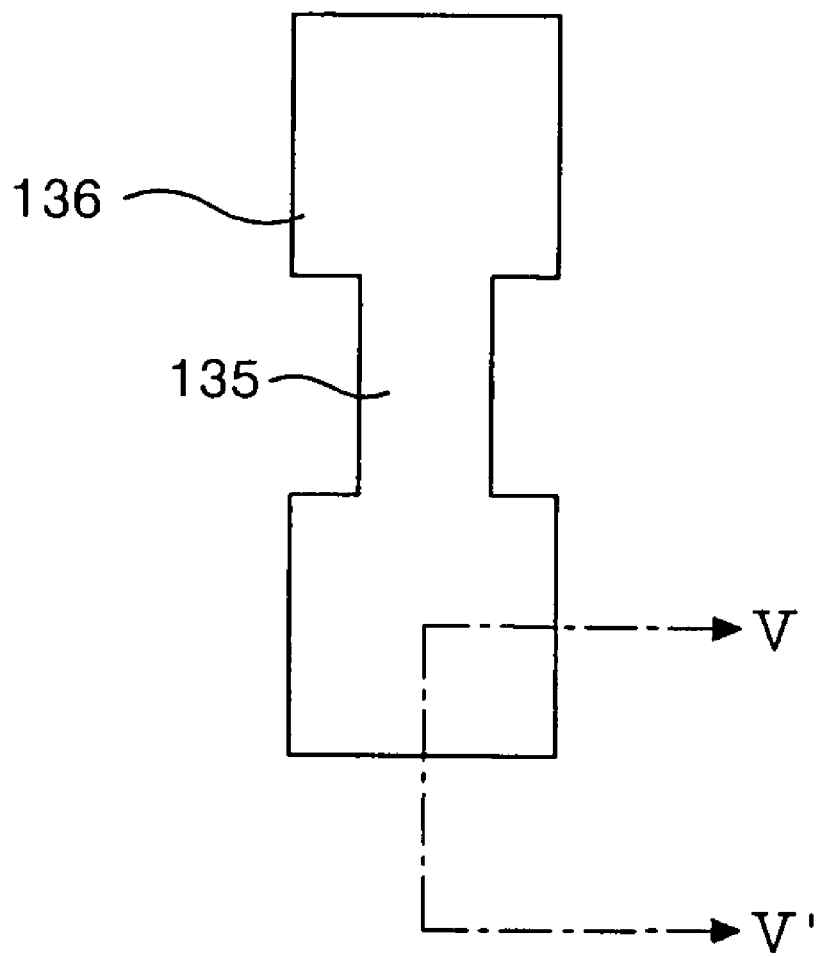
FIGS. 12A and 12B are a plan view and a sectional view describing a first mask process of the transflective thin film transistor substrate shown in FIGS. 11A and 11B.
Figure 12B:
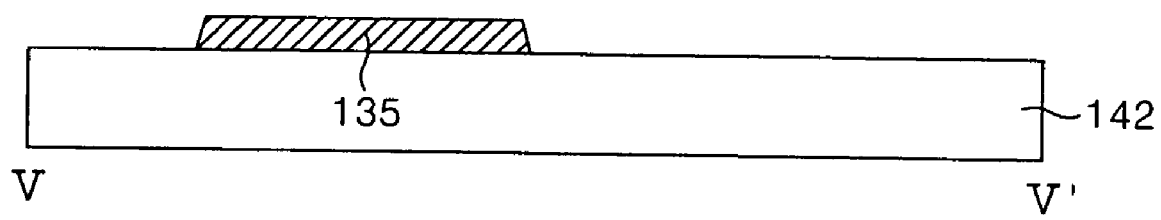

In FIGS. 12A and 12B, a gate metal pattern is formed on the lower substrate 142 by a first mask process, wherein the gate metal pattern includes the data link 135 along with the lower data pad electrode 136. The first mask process is the same as described in FIGS. 4A and 4B.

Figure 13A:
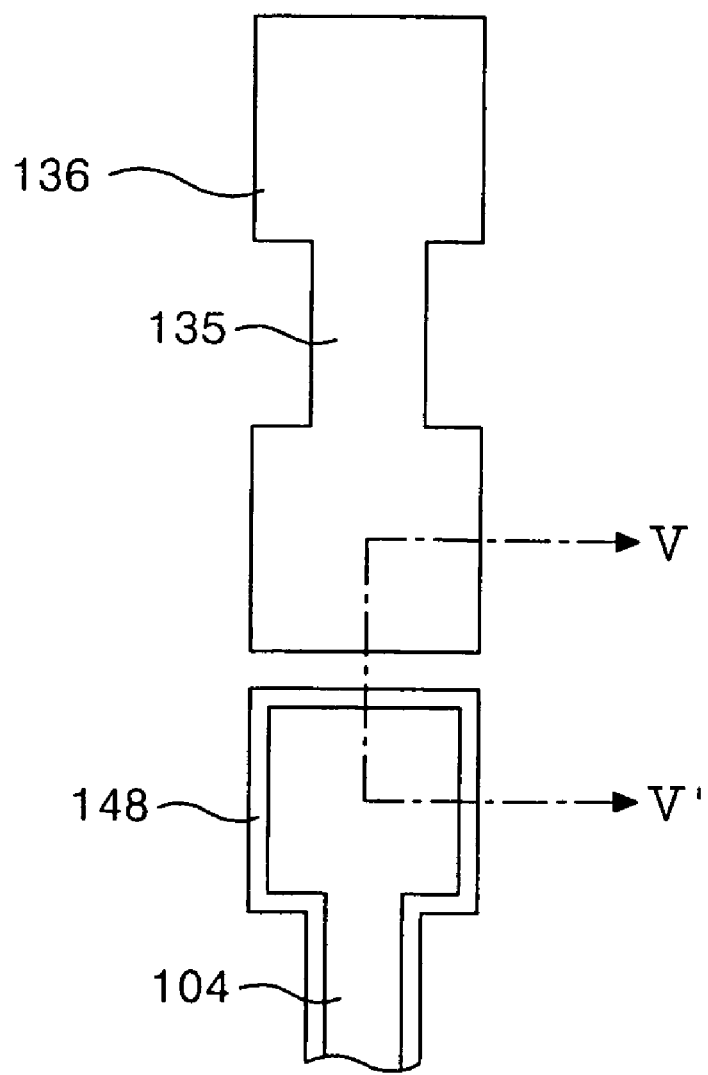
FIGS. 13A and 13B are a plan view and a sectional view describing a second mask process of the transflective thin film transistor substrate in FIGS. 11A and 11B.
Figure 13B:
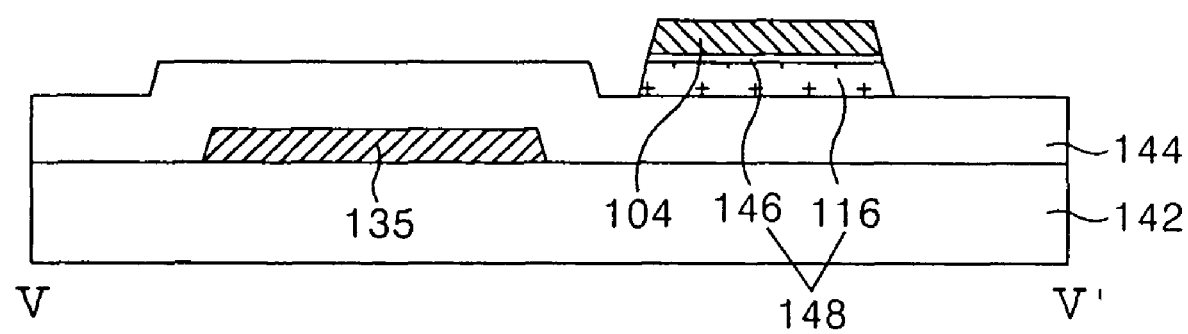

In FIGS. 13A and 13B, a gate insulating film 144 is formed by a second mask process, and a semiconductor pattern 148, including an active layer 116 and an ohmic contact layer 146, and a data line 104 are stacked on the gate insulating film 144. The second mask process is the same as described in FIGS. 5A and 5B.

Figure 14A:
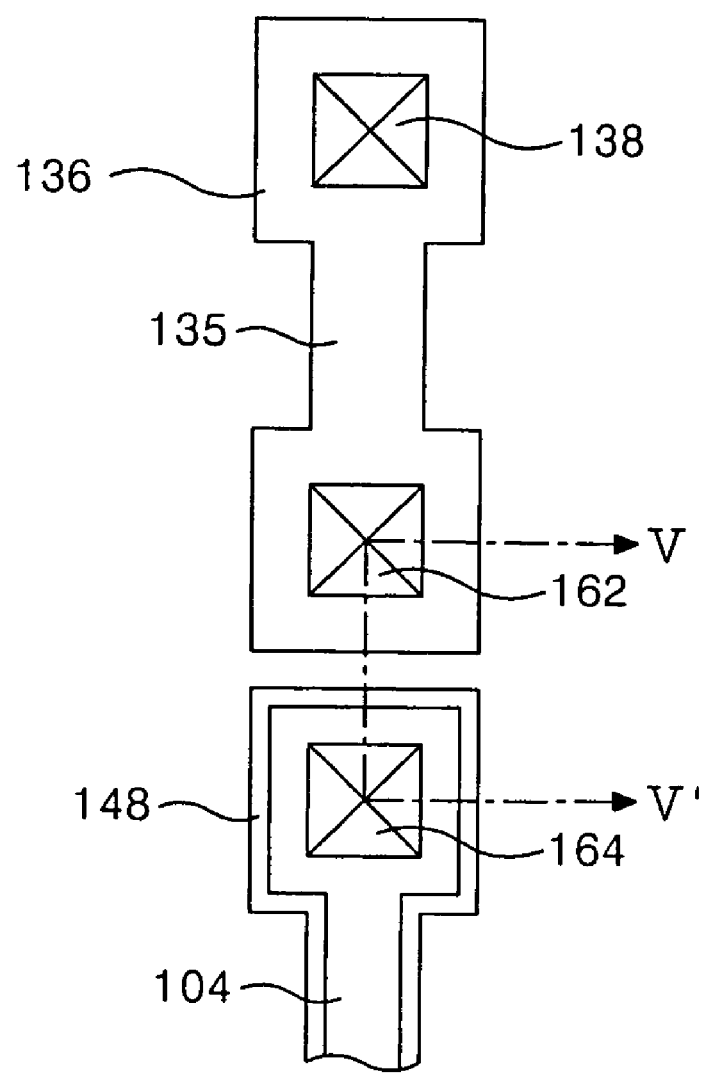
FIGS. 14A and 14B are a plan view and a sectional view describing a third mask process of the transflective thin film transistor substrate in FIGS. 11A and 11B.
Figure 14B:
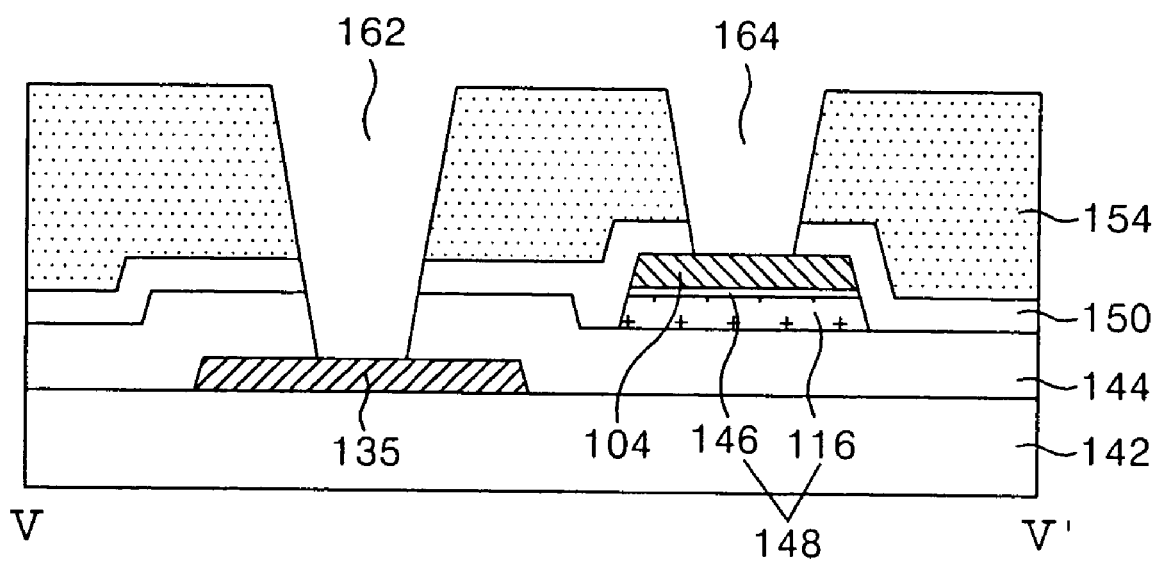

In FIGS. 14A and 14B, a passivation film 150 and an organic insulating film 154 are formed, and third and fourth contact holes 162 and 164, that passing through the passivation film 150 and the organic insulating film 154 are formed, by use of a third mask process. The third contact hole 162 passes through the organic insulating film 154 to the gate insulating film 144 to expose the data link 135, and the fourth contact hole 164 passes through the organic insulating film 154 and the passivation film 150 to expose the data line 104. Herein, the passivation film 150 can be omitted. The third mask process is the same as described in FIGS. 6A and 6B.

Figure 15A:
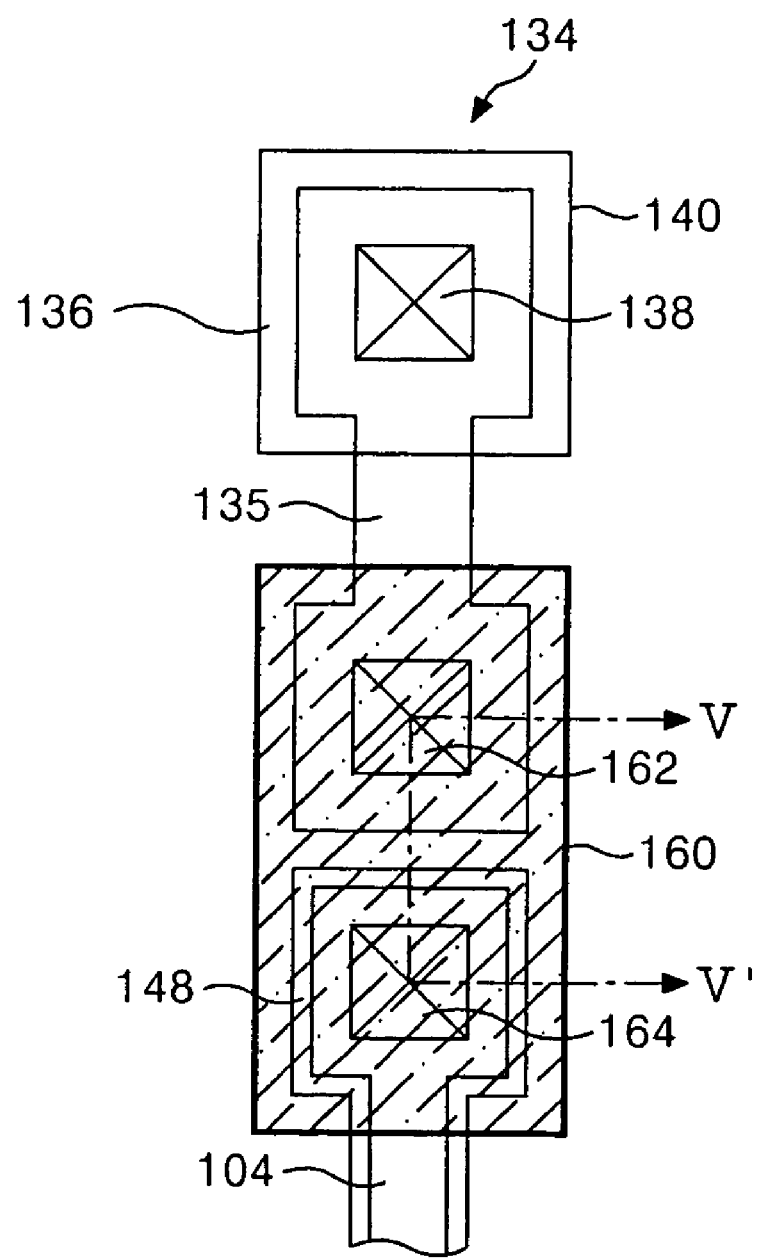
FIGS. 15A and 15B are a plan view and a sectional view describing a fourth mask process of the transflective thin film transistor substrate in FIGS. 10A and 10B.
Figure 15B:
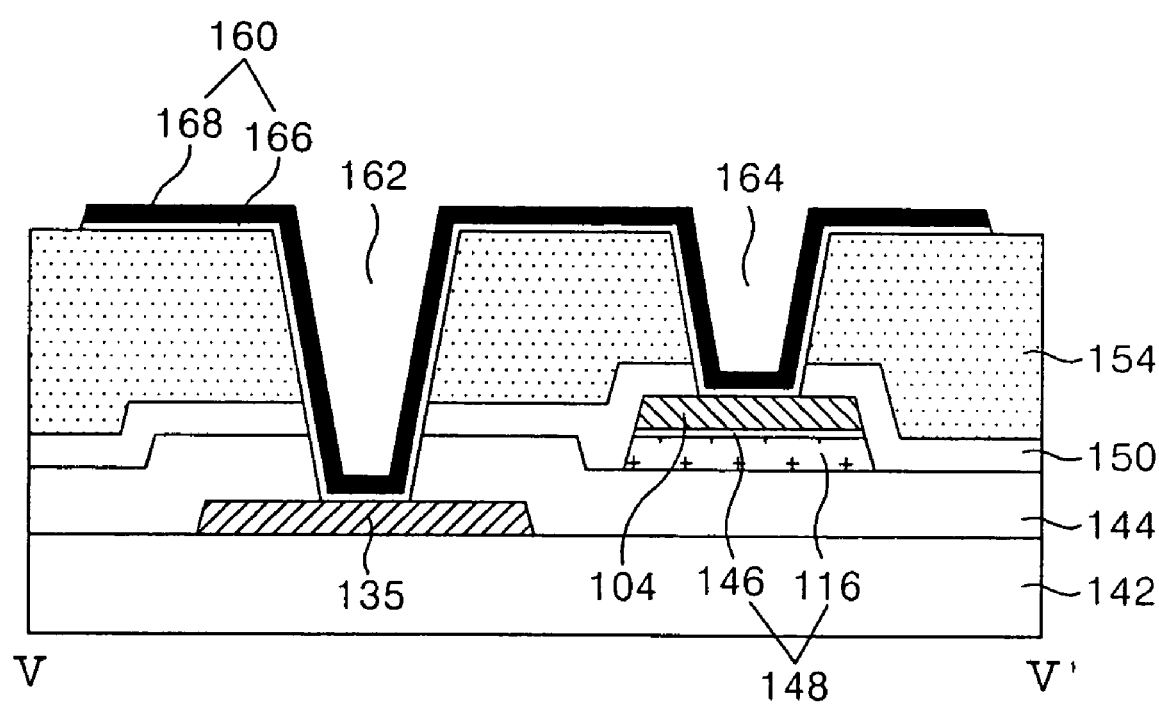

In FIGS. 15A and 15B, the contact electrode 160, having the first and the second contact electrodes 166 and 168, is formed together with the upper data pad electrode 140, by use of a fourth mask process. The contact electrode 160 passes through the first and the second contact holes 162 and 164 to connect the data link 135 with the data line 104. The first contact electrode 166 is formed of the same transparent conductive film as the upper data pad electrode 140, and the second contact electrode 168 is formed of the same reflection metal layer as the above-mentioned reflection electrode 156. The contact electrode 160 is formed to correspond to the first photo-resist pattern 240A of the shielding part P1 as shown in FIG. 8B. At this time, the second contact electrode 168 is the same edge part as the first electrode 166 or has an edge part at an inner side from that of the first electrode 166.

Differently from this, the contact electrode 160 can be formed of only the first contact electrode 166, i.e., the transparent conductive film. In this case, the contact electrode 160 is formed to correspond to the second photo-resist pattern 240B of the partial transmission part P2 as shown in FIG. 8B.

As described above, in the transflective thin film transistor substrate and the method of fabricating method according to the present invention, the organic insulating film is patterned and a plurality of contact holes is formed by one mask process. Further, the transparent conductive pattern, having the pixel electrode, and the reflection electrode are formed by another mask process. Thus, it is possible to simplify processes by performing four mask processes.

In addition, in the transflective thin film transistor substrate and the method of fabricating method according to the present invention, the data link and the data line, formed respectively on different layers, are connected together by the contact electrode including at least one of the transparent conductive film and the reflection metal layer. In this arrangement, the contact electrode is formed in the area to be sealed by the sealant, thus it is possible to prevent the corrosion problem caused by the exposure of the contact electrode formed of the reflection metal layer.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of fabricating a liquid crystal display device, comprising:
   providing first and second substrates;
   forming a gate line on the first substrate, a lower gate pad electrode connected to the gate line, a lower data pad electrode, and a data link extended from the lower data pad electrode, using a first mask during a first mask process;
   forming a gate insulating film on the first substrate, a semiconductor pattern on the gate insulating film, a data line crossing the gate line to define a pixel area on the semiconductor pattern, a source electrode, and a drain electrode using a second mask during a second mask process;
   forming an organic insulating film on the data line, the source electrode and the drain electrode and forming a transmission hole passing through the organic insulating film, a gate pad contact hole exposing the lower gate pad electrode, a data pad contact hole exposing the lower data pad electrode, and a plurality of contact holes exposing the data link and the data line, using a third mask during a third mask process; and
   forming a pixel electrode connected to the drain electrode, passing through the organic insulating film and the transmission hole, forming a reflective electrode on the pixel electrode in a reflective area of the pixel and exposing the pixel electrode in the transmission hole, forming an upper gate pad electrode connected to the lower gate pad electrode via the gate pad contact hole, forming an upper data pad electrode connected to the lower data pad electrode via the data pad contact hole, and forming a contact electrode connected to the data link and the data line through the plurality of contact holes, using a fourth mask during a fourth mask process, in which the contact electrode includes a transparent conductive film same as the pixel electrode and a reflective metal layer same as the reflective electrode,
   wherein the fourth mask process further comprises:
   forming a transparent conductive film and a reflective metal layer on the organic insulating film;
   forming first and second photo-resist patterns on the reflective metal layer using the fourth mask, wherein the first photo-resist pattern is thicker than that of the second photo-resist pattern;
   patterning the transparent conductive film and the reflective metal layer by an etching using the first and the second photo-resist patterns as a mask to form a transparent conductive pattern and a reflective electrode, wherein the transparent conductive pattern has the pixel electrode, the upper pad electrode and the contact electrode, and the reflective electrode has an edge part same as the transparent conductive pattern;
   removing the second photo-resist pattern and thinning the first photo-resist pattern;
   removing the reflective electrode in the transmission hole and on the upper pad electrode by an etching using the first photo-resist pattern as a mask; and
   removing the first photo-resist pattern.

2. The method according to claim 1, wherein:
   the first mask process further includes forming a storage line substantially parallel to the gate line on the first substrate; and
   the second mask process further includes forming a storage capacitor overlapping the storage line with the gate insulating film therebetweeen by extending the drain electrode and the semiconductor pattern.

3. The method according to claim 1, wherein the contact electrode is located at an area to be sealed by a sealant.

4. The method according to claim 1, wherein the reflective electrode is connected to the pixel electrode and encloses a lateral surface of the transmission hole.

5. The method according to claim 1, wherein the first and the second photo-resist patterns are formed by a photolithography process using one of a diffractive exposure mask, a half-tone mask, and a partial exposure mask.

6. The method according to claim 5, wherein the photolithography process has two exposure processes using first and second partial exposure masks in a case of the partial exposure mask.

7. The method according to claim 5, wherein the first photo-resist pattern corresponds to a shielding layer in the first and the second partial exposure masks, and the second photo-resist pattern corresponds to a shielding layer in the first partial exposure mask.

8. The method according to claim 1, wherein the third mask process further comprises forming a passivation film under the organic insulating film.

9. The method according to claim 8, wherein the passivation film is formed of an inorganic insulating material.

10. The method according to claim 8, wherein the transmission hole passes through the organic insulating film to the gate insulating film.

11. The method according to claim 1, wherein the transmission hole passes through the organic insulating film to the gate insulating film.

12. The method according to claim 1, wherein the third mask process further comprises forming a drain contact hole passing through the organic insulating film to expose the drain electrode, wherein the pixel electrode is connected to the drain electrode via the drain contact hole.

13. The method according to claim 1, wherein the reflective electrode and the pixel electrode overlap at least one of the gate line and the data line.

14. The method according to claim 1, wherein the pixel electrode has a different edge from an edge part of the reflective electrode.

* * * * *